(12) United States Patent
Ramsey

(10) Patent No.: US 7,192,992 B2
(45) Date of Patent: *Mar. 20, 2007

(54) ENVIRONMENTALLY FRIENDLY, 100% SOLIDS, ACTINIC RADIATION CURABLE COATING COMPOSITIONS FOR COATING THERMALLY SENSITIVE SURFACES AND/OR RUSTED SURFACES AND METHODS, PROCESSES AND ASSEMBLAGES FOR COATING THEREOF

(75) Inventor: Sally W. Ramsey, Tallmadge, OH (US)

(73) Assignee: Ecology Coating, Inc., Akron, OH (US)

( * ) Notice: Subject to any disclaimer, the term of this patent is extended or adjusted under 35 U.S.C. 154(b) by 7 days.

This patent is subject to a terminal disclaimer.

(21) Appl. No.: 11/003,159

(22) Filed: Dec. 2, 2004

(65) Prior Publication Data
US 2005/0170280 A1    Aug. 4, 2005

Related U.S. Application Data

(63) Continuation-in-part of application No. 10/872,531, filed on Jun. 21, 2004, and a continuation-in-part of application No. 10/771,867, filed on Feb. 4, 2004.

(60) Provisional application No. 60/551,287, filed on Mar. 8, 2004, provisional application No. 60/549,669, filed on Mar. 3, 2004.

(51) Int. Cl.
C08F 2/48 (2006.01)
B32B 9/04 (2006.01)
B32B 9/00 (2006.01)

(52) U.S. Cl. .......................... 522/96; 522/90; 522/100; 522/103; 522/104; 522/107; 522/150; 522/153; 522/152; 522/168; 522/170; 522/172; 522/174; 522/99; 522/178; 522/182; 522/181; 428/411.1; 428/413; 428/416; 428/423.1; 428/432; 428/500

(58) Field of Classification Search .................. 522/100, 522/96, 104, 103, 170, 92, 90, 107, 150, 522/153, 152, 168, 173, 174, 178, 182, 181; 428/411.1, 413, 416, 423.1, 432, 500
See application file for complete search history.

(56) References Cited

U.S. PATENT DOCUMENTS 4,163,809 A * 8/1979 McGinniss et al. ......... 427/500
4,188,455 A * 2/1980 Howard .................... 428/423.1
4,210,687 A   7/1980 Obendorf et al.
4,234,466 A  11/1980 Takahashi et al.
4,721,734 A   1/1988 Gehlhaus et al.
5,182,148 A   1/1993 Kapp et al.
5,453,451 A * 9/1995 Sokol ......................... 522/42
5,733,607 A   3/1998 Mangum et al.
5,773,487 A   6/1998 Sokol
6,039,798 A   3/2000 Aldcroft et al.
6,541,076 B2 * 4/2003 Dunkle ....................... 427/458
6,682,872 B2 * 1/2004 Sachdev et al.
6,784,222 B2 * 8/2004 Zychowski et al. .......... 522/80
2001/0051229 A1 12/2001 Witt
2002/0032249 A1  3/2002 Eckberg et al.
2003/0008934 A1 * 1/2003 Zychowski et al. ............ 522/7
2003/0045598 A1  3/2003 Chen et al.
2003/0138733 A1 * 7/2003 Sachdev et al.
2003/0185990 A1 10/2003 Bittner et al.
2003/0207959 A1 * 11/2003 Napadensky et al.
2004/0071949 A1  4/2004 Glatkowski et al.
2005/0170101 A1 * 8/2005 Ramsey
2005/0170280 A1 * 8/2005 Ramsey
2005/0171227 A1 * 8/2005 Weine

OTHER PUBLICATIONS

D. Breslin, et al., New Acrylated Oligomers with Enhanced Pigment Wetting Properties, available from www.Sartomer.com.
B. Yang, Studies of Pigmented UV Curable Systems by Real Time FTIR, available from www.Sartomer.com.
Economic Considerations of "True" 100% UV Curable Solids Paints and Coatings, Allied PhotoChemical, Inc., Jun. 2002.

* cited by examiner

Primary Examiner—Sanza L. McClendon
(74) Attorney, Agent, or Firm—Wilson Sonsini; Goodrich + Rosati

(57) ABSTRACT

Disclosed are environmentally friendly, substantially all solids coating compositions which are curable using ultraviolet and visible radiation. In addition, the disclosed coating compositions are suitable for coating thermally sensitive objects and/or rusted surfaces. In addition, methods are disclosed for coating surfaces, or at least a portion of the surfaces, and curing of the coated surface to obtain partially or fully cured coated surfaces are also disclosed. Furthermore, articles of manufacture incorporating fully cured coated surfaces are disclosed, including, for example gas tanks such as, barbeque propane tanks. Also disclosed are methods, processes, production lines, articles of manufacture, and factories which incorporate these environmentally friendly, substantially all solids coating compositions curable using ultraviolet and visible radiation.

48 Claims, 6 Drawing Sheets

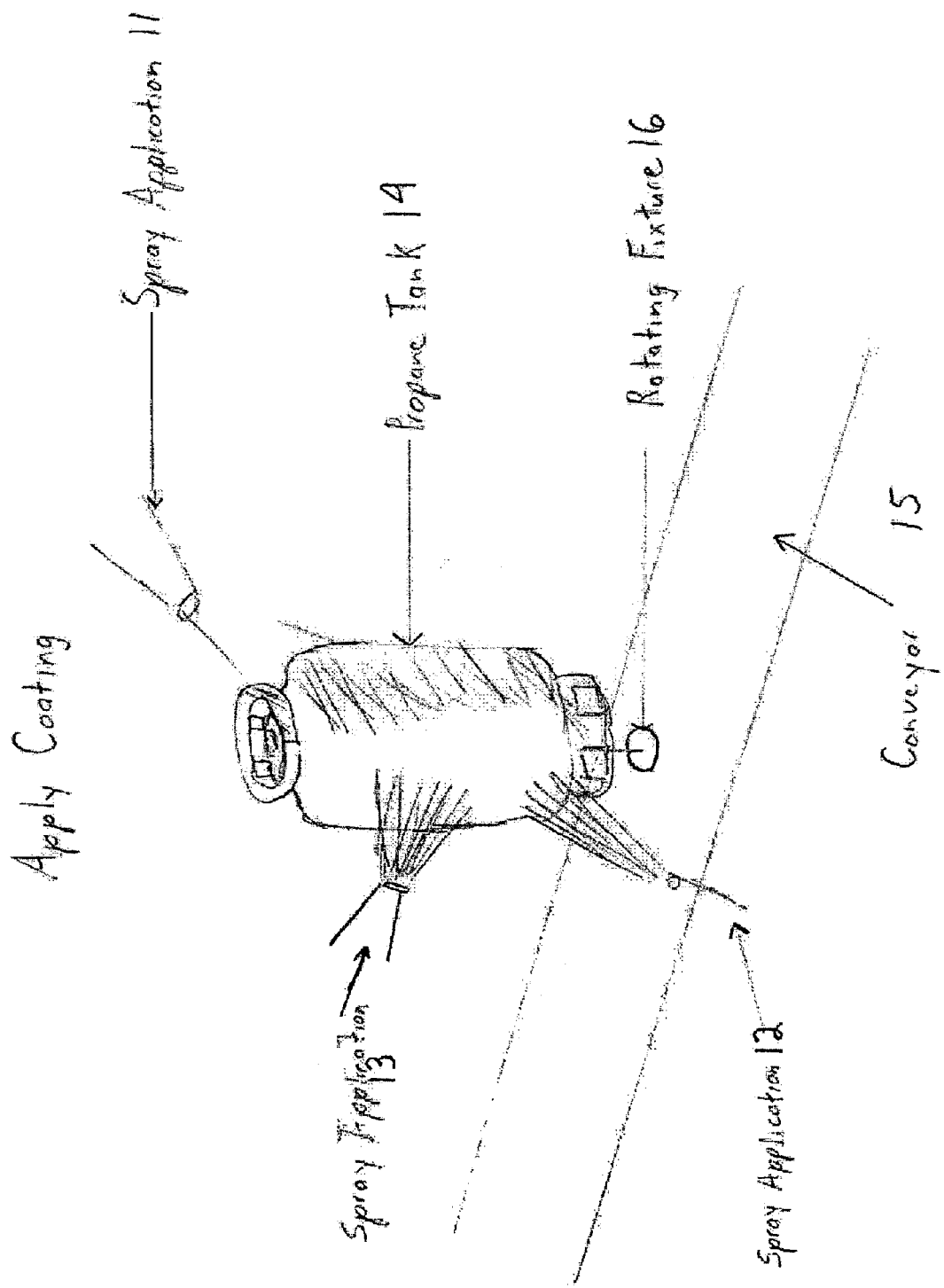

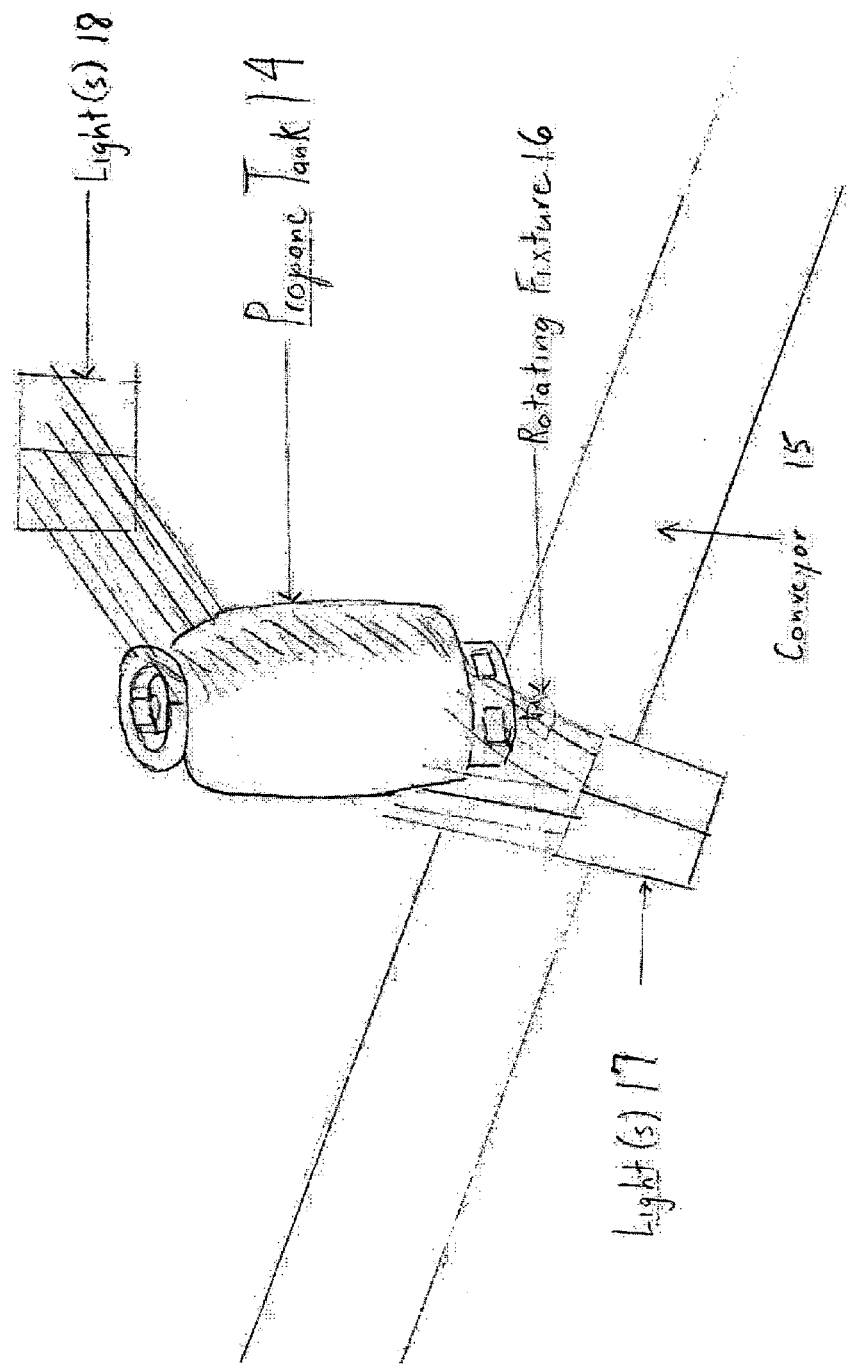

ENVIRONMENTALLY FRIENDLY, 100% SOLIDS, ACTINIC RADIATION CURABLE COATING COMPOSITIONS FOR COATING THERMALLY SENSITIVE SURFACES AND/OR RUSTED SURFACES AND METHODS, PROCESSES AND ASSEMBLAGES FOR COATING THEREOF

CROSS-REFERENCE TO RELATED APPLICATIONS

This application is a continuation-in-part-application of U.S. patent application Ser. No. 10/771,867 filed Feb. 4, 2004, and Ser. No. 10/872,531 filed Jun. 21, 2004, which claims the benefit of U.S. Provisional Application Ser. No. 60/551,287, filed on Mar. 8, 2004; this Application also claims the benefit of U.S. Provisional Application No. 60/549,669, filed on Mar. 3, 2004, the disclosures of all which are hereby incorporated by reference in their entirety.

BACKGROUND OF THE INVENTION

A variety of consumer, scientific, and industrial products incorporate different types of materials, many of which possess dramatically different thermal tolerances; in addition such products may contain materials that are thermally sensitive or combustible. By way of example, certain products, such as gas tanks contain a combination of metallic parts in contact with plastic or rubber components, such as seals to prevent leakage of gas or liquid from the gas tanks.

Coating thermally sensitive objects, such as empty gas cylinders, with corrosion resistant coatings that require thermal curing can be problematic because of thermal deterioration of the plastic or rubber seals. Furthermore, if the gas tanks contain residual amounts of gas (e.g., refurbishing a used gas cylinder), use of a coating that requires thermal curing raises further problems and dangers. These principles apply to any article composed of materials that have different thermal tolerances, especially those that are thermally sensitive and can deteriorate on prolonged exposure to heat.

In addition, any product that is being refurbished with a new coating may require pre-treatment of the surface in order to facilitate application of the coating. Pre-treatment steps may include removal of markings and labels, removal of rust or other oxidation products, removal of the original coating, and general surface cleaning. Clearly, processes and coatings that minimize surface pre-treatment are preferable.

SUMMARY OF THE INVENTION

Presented herein are environmentally friendly actinic radiation curable, substantially all solids compositions and methods for coating thermally sensitive objects which may or may not be rusty. In addition, presented herein are coating compositions suitable for coating objects comprising a rusted surface, and thereby such coating compositions may be used to refurbish used objects. Such coating compositions produce less volatile materials, produce less waste and require less energy. Furthermore, such coating compositions may be used to produce coatings having desirable esthetic, performance and durability properties. Further presented are partially and fully cured surfaces, along with refurbished articles and articles of manufacture incorporating fully cured surfaces.

In one aspect the actinic radiation curable, substantially all solids compositions described herein are comprised of a mixture of oligomers, monomers, photoinitiators, co-photoinitiators, fillers, and polymerizable pigment dispersions. In one embodiment of the this aspect, the actinic radiation curable, substantially all solids composition mixture may comprise 25–45% by weight of an oligomer or a multiplicity of oligomers, plus monomers, photoinitiators, co-photoinitiators, fillers, and polymerizable pigment dispersions.

In another embodiment of the above aspect, the actinic radiation curable, substantially all solids composition mixture comprises 45–60% by weight of a monomer or a multiplicity of monomers; plus oligomers, photoinitatiors, co-photoinitiators, fillers, and polymerizable pigment dispersions. In a further embodiment of the aforementioned aspect, the actinic radiation curable, substantially all solids composition mixture comprises 2–11% by weight of a photoinitiator or a multiplicity of photoinitiators and co-initiators; plus oligomers, monomers, fillers, and polymerizable pigment dispersions. In a still further embodiment of the above aspect, the actinic radiation curable, substantially all solids composition mixture comprises 0.1–3% by weight of a filler or a multiplicity of fillers; plus oligomers, monomers, photoinitatiors, co-photoinitiators, and polymerizable pigment dispersions. In yet another embodiment of the aforementioned aspect, the actinic radiation curable, substantially all solids composition mixture comprises 8–12% by weight of a polymerizable pigment dispersion or a multiplicity of polymerizable pigment dispersions; plus oligomers, monomers, photoinitatiors, co-photoinitiators, and fillers. In an embodiment of the above aspect, the actinic radiation curable, substantially all solids composition comprises 25–45% percent by weight of an oligomer or a multiplicity of oligomers, and 45–60% by weight of a monomer or a multiplicity of monomers; plus photoinitatiors, co-photoinitiators, fillers, and polymerizable pigment dispersions. In another embodiment of the aforementioned aspect, the actinic radiation curable, substantially all solids composition comprises 25–45% percent by weight of an oligomer or a multiplicity of oligomers, 45–60% by weight a monomer or a multiplicity of monomers and 2–11% by weight of a photoinitiator or a multiplicity of photoinitiators and co-initiators; plus, fillers, and polymerizable pigment dispersions. In a further embodiment of the above aspect, the actinic radiation curable, substantially all solids composition mixture comprises 25–45% percent by weight of an oligomer or a multiplicity of oligomers, 45–60% by weight of a monomer or a multiplicity of monomers, 2–11% by weight of a photoinitiator or a multiplicity of photoinitiators and co-initiators and 0.1–3% by weight of a filler or a multiplicity of fillers; plus polymerizable pigment dispersions. In still further embodiment of the aforementioned aspect, the actinic radiation curable, substantially all solids composition mixture comprises 25–45% percent by weight an oligomer or a multiplicity of oligomers, 45–60% by weight of a monomer or a multiplicity of monomers, 2–11% by weight of a photoinitiator or a multiplicity of photoinitiators and co-initiators, 0.1–3% by weight of a filler or a multiplicity of fillers, and 8–12% by weight of a polymerizable pigment dispersion or a multiplicity of polymerizable pigment dispersions; whereby the room temperature viscosity of the composition is up to about 500 centipoise.

In a further or alternative embodiment, the oligomer is selected from a group consisting of an epoxy acrylate, an epoxy diacrylate/monomer blend, a bisphenol epoxy acrylate blended with trimethylolpropane triacrylate, and combinations thereof. In a further or alternative embodiment, the monomers are selected from a group consisting of trimethylolpropane triacrylate, 2-phenoxyethyl acrylate, isobornyl acrylate, propoxylated glyceryl triacrylate, a methacrylate ester derivative, and combinations thereof.

In a still further or alternative embodiment, the photoinitiators are selected from a group consisting of phosphine oxides, diphenyl(2,4,6-trimethylbenzoyl)phosphine oxide, a thioxanthone, dimethyl ketal, benzophenone, 1-hydroxycyclohexyl phenyl ketone, 2-hydroxy-2-methyl-1-phenyl-propan-1-one, 2,4,6,-trimethylbenzophenone, 4-methylbenzophenone, oligo(2-hydroxy-2-methyl-1-(4-(1-methylvinyl)phenyl)propanone), an amine acrylate, and combinations thereof.

In a still further or alternative embodiment, the fillers are selected from a group consisting of amorphous silicon dioxide prepared with polyethylene wax, synthetic amorphous silica with organic surface treatment, IRGANOX®, untreated amorphous silicon dioxide, alkyl quaternary bentonite, colloidal silica, acrylated colloidal silica, alumina, zirconia, zinc oxide, niobia, titania aluminum nitride, silver oxide, cerium oxides, and combinations thereof. Further, the average size of the filler particles is less than 500 nanometers, or less than 100 nanometers, or less than 50 nanometers, or even less than 25 nanometers.

In a still further or alternative embodiment, the actinic radiation curable, substantially all solids composition are heavily pigmented, wherein the polymerizable pigment dispersions are comprised of pigments attached to activated resins, such as acrylate resins, methacrylate resins, or vinyl resins, and, wherein, the pigments are selected from a group consisting of carbon black, rutile titanium dioxide, organic red pigment, phthalo blue pigment, red oxide pigment, isoindoline yellow pigment, phthalo green pigment, quinacridone violet, carbazole violet, masstone black, light lemon yellow oxide, light organic yellow, transparent yellow oxide, diarylide orange, quinacridone red, organic scarlet, light organic red, and deep organic red.

In a still further or alternative embodiment, the actinic radiation curable, substantially all solids composition has a room temperature viscosity of up to about 500 centipoise.

In a still further or alternative embodiment, the actinic radiation curable, substantially all solids composition is suitable for coating thermally sensitive objects which are new or used. In a still further or alternative embodiment, the actinic radiation curable, substantially all solids composition is suitable for coating thermally sensitive objects which have been refurbished, or is suitable for recoating used, previously coated, objects. In a further or alternative embodiment, the actinic radiation curable, substantially all solids composition is suitable for coating an object comprising a rusted surface portion. In a further or alternative embodiment, the object comprising a rusted surface portion is a used object or a refurbished object. In a further or alternative embodiment, the object comprising a rusted surface portion is a thermally sensitive object.

In further or alternative embodiments, the coating can be applied to the surface by means of spraying, brushing, rolling, dipping, blade coating, curtain coating or a combination thereof. Further, the means of spraying includes, but is not limited to, the use of a high pressure low volume spraying systems, air-assisted/airless spraying systems, or electrostatic spraying systems. In further or alternative embodiments, the coating is applied in a single application, or in multiple applications. In further or alternative embodiments, the surfaces of new or used objects are partially covered by the coating, or in a still further or alternative embodiments, the surfaces of new or used objects are fully covered by the coating.

In further or alternative embodiments, prior to coating new or used objects with an actinic radiation curable, substantially all solids composition, a portion of the pre-coated surface of new or used objects is oxidized. In still further or alternative embodiments, a substantial portion of the pre-coated surface of new or used objects is oxidized. In further or alternative embodiments, the pre-coated surface of new or used objects is clean or dirty, and/or includes a marking. In addition, the marking is a label selected from a group consisting of an adhering label, a stenciled label, a hand-written label, and combinations thereof.

In further or alternative embodiments, the pre-coated surface becomes partially covered, or becomes fully covered by the uncured coating. In further or alternative embodiments, the object with an uncured coated surface comprises metal, wood, plastic, rubber, or organic polymers.

In further or alternative embodiments, the coated surfaces are partially cured by exposure of uncured coated surfaces to a first source of actinic radiation. In further or alternative embodiments, the partially cured surfaces are opaque or glossy, or opaque and glossy.

In further or alternative embodiments, the coated surfaces are fully cured by exposure of the partially cured coated surface to a second source of actinic radiation. In further or alternative embodiments, the fully cured surfaces are opaque, hard, glossy, corrosion resistant, abrasion resistant, or any combinations thereof.

In further or alternative embodiments, the actinic radiation is selected from the group consisting of visible radiation, near visible radiation, ultra-violet (UV) radiation, and combinations thereof. Further, the UV radiation is selected from the group consisting of UV-A radiation, UV-B radiation, UV-B radiation, UV-C radiation, UV-D radiation, or combinations thereof.

In further or alternative embodiments, the completely cured coated surface is part of a refurbished object, wherein the refurbished object is a new or used article of manufacture. In further or alternative embodiments, the completely cured coated surface is part of articles of manufacture. In further or alternative embodiments, the refurbished objects include the completely cured coated surface. In further or alternative embodiments, the articles of manufacture include the completely cured coated surface. In further or alternative embodiments, the article of manufacture is a gas tank selected from the group consisting of barbeque propane tanks, industrial gas tanks, and portable camp stove cylinders.

In a further aspect the method for producing the actinic radiation curable, substantially all solids composition involves adding the components, for instance, by way of example only, at least one oligomer, at least one monomer, at least one photoinitiator, at least one co-photoinitiator, at least one filler, and at least one polymerizable pigment dispersion, to a container and using a means for mixing the components to form a smooth composition. In further or alternative embodiments, the composition can be mixed in or transferred to a suitable container, such as, but not limited to, a can.

In another aspect are assemblages for coating thermally sensitive objects and/or coating an rusty object with an actinic radiation curable, substantially all solids composition comprising a means for applying to the object an actinic radiation curable, substantially all solids composition; a means for irradiating the applied coating with a first actinic radiation so as to partially cure the applied coating on the surface; and a means for irradiating the object with a second actinic radiation so as to completely cure the partially cured coating on the surface.

In one embodiment of such assemblages, the actinic radiation curable, substantially all solids composition is comprised of a mixture of oligomers, monomers, photoinitiatiors, co-photoinitiators, fillers, and polymerizable pigment dispersions. In a further embodiment, the means for irradiating so as to partially cure the coated surface and the means for irradiating so as to completely cure the coated surface are located at an irradiation station so as to not require the transport of the object. In still a further embodiment, the means for applying the composition is located at an application station, wherein the object must be moved from the application station to the irradiation station. In yet a further embodiment, such assemblages further comprise a means for moving the object from the application station to the irradiation station. In still yet a further embodiment, the means for moving comprises a conveyer belt.

In further or alternative embodiments, the irradiation station comprises a means for limiting the exposure of actinic radiation to the application station. In yet further or alternative embodiment, assemblages further comprise a means for rotating the object around at least one axis. In yet further or alternative embodiment, assemblages further comprise a mounting station wherein the object to be coated is attached to a movable unit. In further embodiments, the movable unit is capable of rotating the object around at least one axis. In further or alternative embodiments, the movable unit is capable of moving the object from the application station to the irradiation station.

In still further or alternative embodiments, such assemblages further comprise a removal station wherein the completely cured coated object is removed from the movable unit. In further embodiments, the completely cured coated object does not require cooling prior to removal from the movable unit.

In further or alternative embodiments, the means for applying includes spraying means, brushing means, rolling means, dipping means, blade coating, and curtain coating means. In further embodiments, the means for applying includes a spraying means. In still further embodiments, the spraying means includes equipment for high volume low pressure (HVLP) spraying. In further or alternative embodiments, the means for applying occurs at ambient temperature. In further or alternative embodiments, the spraying means includes equipment for electrostatic spraying. In further or alternative embodiments, the spraying means includes equipment for air-assisted/airless spraying.

In further or alternative embodiments, the application station further comprises a means for reclaiming actinic radiation curable, substantially all solids composition that is non-adhering to the surface of the object. In still further embodiments, the reclaimed actinic radiation curable, substantially all solids composition is subsequently applied to a different object.

In one embodiment of such assemblages for coating at least a portion of a surface, the actinic radiation curable, substantially all solids composition may comprise 25–45% by weight of an oligomer or a multiplicity of oligomers, plus monomers, photoinitiators, co-photoinitiators, fillers, and polymerizable pigment dispersions. In another embodiment of the above aspect, the actinic radiation curable, substantially all solids composition mixture comprises 45–60% by weight of a monomer or a multiplicity of monomers; plus oligomers, photoinitiatiors, co-photoinitiators, fillers, and polymerizable pigment dispersions. In a further embodiment of the aforementioned aspect, the actinic radiation curable, substantially all solids composition mixture comprises 2–11% by weight of a photoinitiator or a multiplicity of photoinitiators and co-initiators; plus oligomers, monomers, fillers, and polymerizable pigment dispersions. In a still further embodiment of the above aspect, the actinic radiation curable, substantially all solids composition mixture comprises 0.1–3% by weight of a filler or a multiplicity of fillers; plus oligomers, monomers, photoinitiatiors, co-photoinitiators, and polymerizable pigment dispersions. In yet another embodiment of the aforementioned aspect, the actinic radiation curable, substantially all solids composition mixture comprises 8–12% by weight of a polymerizable pigment dispersion or a multiplicity of polymerizable pigment dispersions; plus oligomers, monomers, photoinitiatiors, co-photoinitiators, and fillers. In an embodiment of the above aspect, the actinic radiation curable, substantially all solids composition comprises 25–45% percent by weight of an oligomer or a multiplicity of oligomers, and 45–60% by weight of a monomer or a multiplicity of monomers; plus photoinitiatiors, co-photoinitiators, fillers, and polymerizable pigment dispersions. In another embodiment of the aforementioned aspect, the actinic radiation curable, substantially all solids composition comprises 25–45% percent by weight of an oligomer or a multiplicity of oligomers, 45–60% by weight a monomer or a multiplicity of monomers and 2–11% by weight of a photoinitiator or a multiplicity of photoinitiators and co-initiators; plus, fillers, and polymerizable pigment dispersions. In a further embodiment of the above aspect, the actinic radiation curable, substantially all solids composition mixture comprises 25–45% percent by weight of an oligomer or a multiplicity of oligomers, 45–60% by weight of a monomer or a multiplicity of monomers, 2–11% by weight of a photoinitiator or a multiplicity of photoinitiators and co-initiators and 0.1–3% by weight of a filler or a multiplicity of fillers; plus polymerizable pigment dispersions. In still further embodiment of the aforementioned aspect, the actinic radiation curable, substantially all solids composition mixture comprises 25–45% percent by weight an oligomer or a multiplicity of oligomers, 45–60% by weight of a monomer or a multiplicity of monomers, 2–11% by weight of a photoinitiator or a multiplicity of photoinitiators and co-initiators, 0.1–3% by weight of a filler or a multiplicity of fillers, and 8–12% by weight of a polymerizable pigment dispersion or a multiplicity of polymerizable pigment dispersions; whereby the room temperature viscosity of the composition is up to about 500 centipoise.

In further or alternative embodiments, the first actinic radiation of the assemblage for coating at least a portion of a surface includes actinic radiation selected from the group consisting of visible radiation, near visible radiation, ultraviolet (UV) radiation, and combinations thereof. In further or alternative embodiments, the second actinic radiation of the assemblage for coating at least a portion of a surface includes actinic radiation selected from the group consisting of visible radiation, near visible radiation, ultra-violet (UV) radiation, and combinations thereof. In further or alternative embodiments, the irradiation station includes an arrangement of mirrors.

In further or alternative embodiments of this aspect, the objects being coated are thermally sensitive objects, such as gas tanks. In still further or alternative embodiments of this aspect, the objects comprise rusted surface portions.

In another aspect are processes for coating a at least a portion of surface of an object with an actinic radiation curable, substantially all solids composition comprising attaching the object onto a conveying means; applying an actinic radiation curable composition at an application station onto the surface of the object; moving the coated object via the conveying means to an irradiation station; irradiating and partially curing the coated surface at the irradiation station with a first actinic radiation; and irradiating and completely curing the coated surface at the irradiation station with a second actinic radiation; wherein the composition is suitable for coating thermally sensitive objects and/or suitable for coating an object comprising a rusted surface portion.

In further embodiments, such processes further comprise attaching the object to a rotatable spindle prior to the application step. In further or alternative embodiments, such processes further comprise moving the conveying means after attaching the object to the rotatable spindle so as to locate the object near an application station. In further embodiments, such processes further comprise applying an actinic radiation curable composition at the application station as the spindle holding the object rotates. In further embodiments, the conveying means comprises a conveyer belt.

In further or alternative embodiments, the irradiation station comprises a curing chamber containing a first actinic radiation source and a second actinic radiation source.

In further embodiments, such processes further comprise moving the completely cured coated object via the conveying means outside the curing chamber wherein the coated object is packed for storage or shipment.

In one embodiment of such processes for coating at least a portion of a surface, the actinic radiation curable, substantially all solids composition may comprise 25–45% by weight of an oligomer or a multiplicity of oligomers, plus monomers, photoinitiators, co-photoinitiators, fillers, and polymerizable pigment dispersions. In another embodiment of the above aspect, the actinic radiation curable, substantially all solids composition mixture comprises 45–60% by weight of a monomer or a multiplicity of monomers; plus oligomers, photoinitatiors, co-photoinitiators, fillers, and polymerizable pigment dispersions. In a further embodiment of the aforementioned aspect, the actinic radiation curable, substantially all solids composition mixture comprises 2–11% by weight of a photoinitiator or a multiplicity of photoinitiators and co-initiators; plus oligomers, monomers, fillers, and polymerizable pigment dispersions. In a still further embodiment of the above aspect, the actinic radiation curable, substantially all solids composition mixture comprises 0.1–3% by weight of a filler or a multiplicity of fillers; plus oligomers, monomers, photoinitatiors, co-photoinitiators, and polymerizable pigment dispersions. In yet another embodiment of the aforementioned aspect, the actinic radiation curable, substantially all solids composition mixture comprises 8–12% by weight of a polymerizable pigment dispersion or a multiplicity of polymerizable pigment dispersions; plus oligomers, monomers, photoinitatiors, co-photoinitiators, and fillers. In an embodiment of the above aspect, the actinic radiation curable, substantially all solids composition comprises 25–45% percent by weight of an oligomer or a multiplicity of oligomers, and 45–60% by weight of a monomer or a multiplicity of monomers; plus photoinitatiors, co-photoinitiators, fillers, and polymerizable pigment dispersions. In another embodiment of the aforementioned aspect, the actinic radiation curable, substantially all solids composition comprises 25–45% percent by weight of an oligomer or a multiplicity of oligomers, 45–60% by weight a monomer or a multiplicity of monomers and 2–11% by weight of a photoinitiator or a multiplicity of photoinitiators and co-initiators; plus, fillers, and polymerizable pigment dispersions. In a further embodiment of the above aspect, the actinic radiation curable, substantially all solids composition mixture comprises 25–45% percent by weight of an oligomer or a multiplicity of oligomers, 45–60% by weight of a monomer or a multiplicity of monomers, 2–11% by weight of a photoinitiator or a multiplicity of photoinitiators and co-initiators and 0.1–3% by weight of a filler or a multiplicity of fillers; plus polymerizable pigment dispersions. In still further embodiment of the aforementioned aspect, the actinic radiation curable, substantially all solids composition mixture comprises 25–45% percent by weight an oligomer or a multiplicity of oligomers, 45–60% by weight of a monomer or a multiplicity of monomers, 2–11% by weight of a photoinitiator or a multiplicity of photoinitiators and co-initiators, 0.1–3% by weight of a filler or a multiplicity of fillers, and 8–12% by weight of a polymerizable pigment dispersion or a multiplicity of polymerizable pigment dispersions; whereby the room temperature viscosity of the composition is up to about 500 centipoise.

In further or alternative embodiments, the application station comprises equipment for electrostatic spray. In further or alternative embodiments, the application station comprises equipment suitable for air-assisted/airless spraying. In further or alternative embodiments, the application station comprises equipment suitable for High pressure Low Volume (HVLP) coatings application. In either case, further or alternative embodiments include processes wherein the coating is applied in a single application, or the coating is applied in multiple applications. Further, in either case, further or alternative embodiments include processes wherein the surface is partially covered by the coating, or the surface is fully covered by the coating.

In further or alternative embodiments, the time between the first actinic radiation step and the second actinic radiation step is less than 5 minutes. In further embodiments, the time between the first actinic radiation step and the second actinic radiation step is less than 1 minute. In further embodiments, the time between the first actinic radiation step and the second actinic radiation step is less than 15 seconds.

In further or alternative embodiments, the length of time of the first actinic radiation step is shorter than the length of time of the second actinic radiation step. In further or alternative embodiments, the length of time of the first actinic radiation step is longer than the length of time of the second actinic radiation step. In further or alternative embodiments, the length of time of the first actinic radiation step is identical to the length of time of the second actinic radiation step.

In further or alternative embodiments, the irradiation station includes at least one light capable of providing actinic radiation selected from the group consisting of visible radiation, near visible radiation, ultra-violet (UV) radiation, and combinations thereof.

In further or alternative embodiments, the irradiation station includes at least one light source capable of providing actinic radiation selected from the group consisting of UV-A radiation, UV-B radiation, UV-B radiation, UV-C radiation, UV-D radiation, or combinations thereof.

In further or alternative embodiments, the irradiation station includes an arrangement of mirrors such that the coated surface is cured in three dimensions. In further or alternative embodiments, the irradiation station includes an arrangement of light sources such that the coated surface is cured in three dimensions. In further embodiments, each light source emits different spectral wavelength ranges. In further embodiments, the different light sources have partially overlapping spectral wavelength ranges.

In another aspect are production lines for coating at least a portion of a surface of an object with an actinic radiation curable, substantially all solids composition comprising a process comprising attaching the object onto a conveying means; applying an actinic radiation curable composition at an application station onto the surface of the object; moving the coated object via the conveying means to an irradiation station; irradiating and partially curing the coated surface at the irradiation station with a first actinic radiation; and irradiating and completely curing the coated surface at the irradiation station with a second actinic radiation; wherein the composition is suitable for coating thermally sensitive objects and/or suitable for coating an object comprising a rusted surface portion.

In an embodiment of this aforementioned aspect the objects coated, at least in part, on the production line are thermally sensitive objects, and/or objects comprising a rusted surface.

In another aspect are facilities or factories for producing objects coated at least in part with an actinic radiation cured substantially all solids composition comprising at least one production line for coating a surface of an object with an actinic radiation curable, substantially all solids composition comprising a process comprising attaching the object onto a conveying means; applying an actinic radiation curable composition at an application station onto the surface of the object; moving the coated object via the conveying means to an irradiation station; irradiating and partially curing the coated surface at the irradiation station with a first actinic radiation; and irradiating and completely curing the coated surface at the irradiation station with a second actinic radiation; wherein the composition is suitable for coating thermally sensitive objects and/or suitable for coating an object comprising a rusted surface portion.

INCORPORATION BY REFERENCE

All publications, patents and patent applications mentioned in this specification are herein incorporated by reference in their entirety to the same extent as if each individual publication, patent or patent application was specifically and individually indicated to be incorporated by reference.

BRIEF DESCRIPTION OF THE FIGURES

A better understanding of the features and advantages of the present methods and compositions may be obtained by reference to the following detailed description that sets forth illustrative embodiments, in which the principles of our methods, compositions, devices and apparatuses are utilized, and the accompanying drawings of which:

FIG. 5 is an illustration of one method by which the coatings described herein are applied.

FIG. 6 is an illustration of one method for curing the coating.

DETAILED DESCRIPTION OF THE INVENTION

Figure 1:
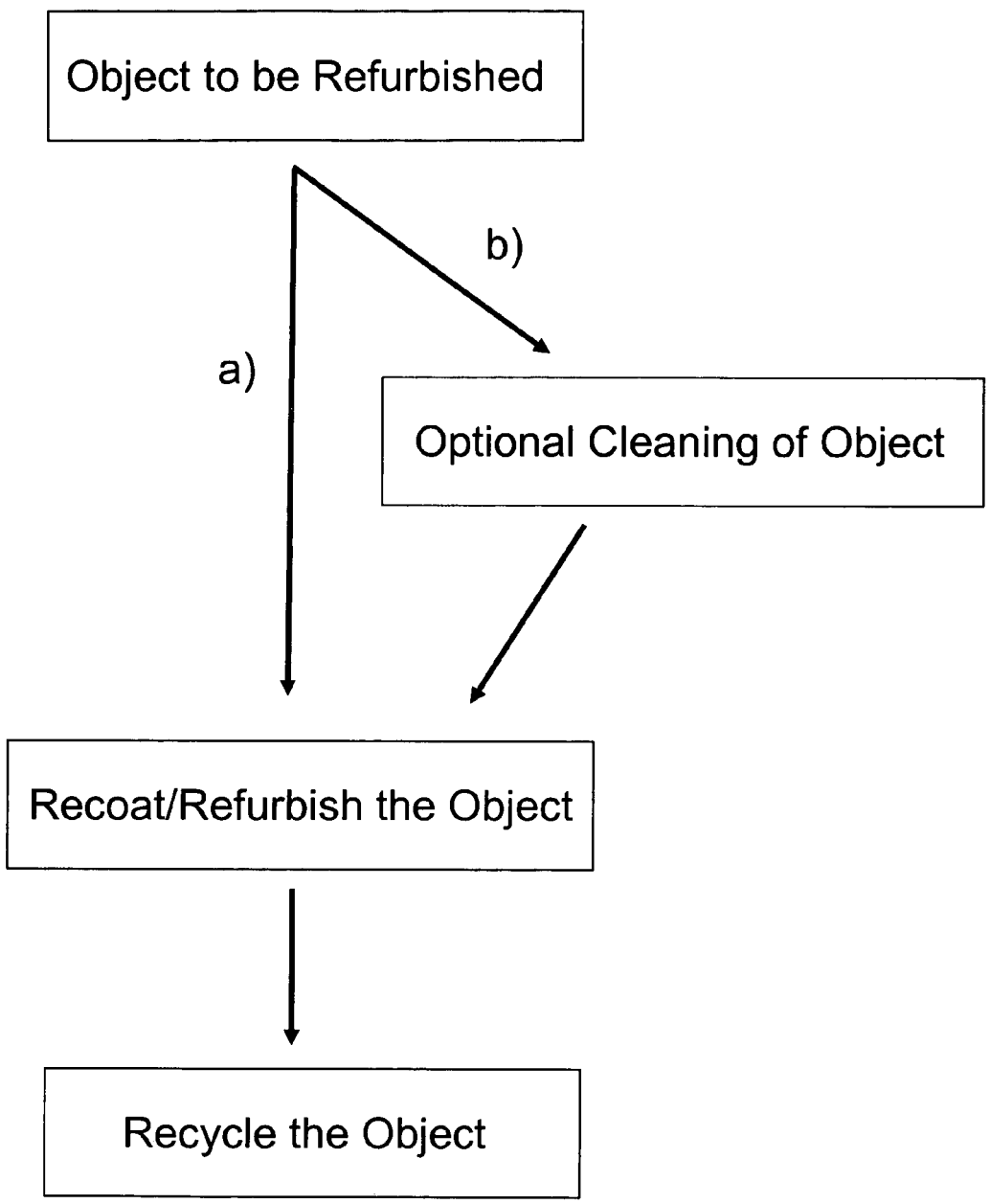
FIG. 1 is a flowchart of one possible process for recoating, refurbishing, and/or recycling a used object with the coating compositions described herein.

The 100% solids, actinic radiation curable coating compositions, methods of applying the compositions, coated surfaces and coated articles described herein, materially enhance the quality of the environment by incorporation of components which are zero or near zero volatile organic compounds (VOC's). Further, such components are essentially non-volatile and therefore have zero or near zero emissions. Such a decrease in emissions significantly decreases air pollution, especially in comparison to the air pollution encountered with coating composition using volatile solvents. In addition, any water and soil pollution associated with waste disposal from processes using coating composition using volatile solvents is minimized using the methods described herein, thereby further contributing to and materially enhancing the quality of the environment. Furthermore, the 100% solids, actinic radiation curable coating compositions, methods, processes and assemblages for applying the compositions, coated surfaces and coated articles described herein, utilize significantly less energy than processes using coating composition using volatile solvents, thereby conserving energy. Furthermore, the compositions and methods described herein may be used to refurbish items that might otherwise be discarded, including articles comprising rusted or otherwise oxidized surfaces or surfaces covered in markings or labels.

1. Coatings

Coatings have been applied to surfaces using either solvent-based systems, including aqueous or non-aqueous solvent-based systems, or powders. The non-aqueous solvent-based systems include organic solvents, oils, or alcohols. Organic solvents have properties that make them very desirable in coatings application. Traditionally, paint manufacturers have relied on organic solvents to act as the carrier to evenly disperse the paints over the surface and then evaporate quickly. To achieve this, organic solvents are used to thin/dilute the coating compositions. However, due to their high volatility such organic solvents create high emission concentrations and are therefore classified as Volatile Organic Compounds (VOC's) and Hazardous Air Pollutants (HAP's). These solvent emissions are of concern to employers and employees in facilities in which such VOC's and HAP's are employed, as overexposure can cause renal damage or other health related difficulties. Furthermore, environmental issues, and potential fire hazards are other issues to consider when using coatings which incorporate organic solvents. These aspects may ultimately result in financial ramifications, including medical expenses, environmental cleanup, and insurance premiums. Another aspect associated with the solvent-based coating formulations, as well as powder coatings, is that large areas are needed to accomplish thermal curing. This requires a significant financial commitment from the coating end user, in terms of leasing or purchasing space, and the cost of energy associated with the thermal curing process. Furthermore, such thermally-based curing processes may be incompatible when coating objects having thermally-sensitive or flammable components.

2. Thermoset Powder Coatings

Powder-based coating compositions and aqueous-based formulations were developed to address the issue of volatile emissions associated with non-aqueous solvent-based systems. Powder-based coatings, which can include thermoset or UV-cure formulations, may decrease emissions, however due to the need for thermal melting, smoothing and curing (for thermoset powders); such powder-based coatings also require considerable time, space, and energy. Water-based coatings decrease emissions, and may decrease energy usage when the coated articles are air dried. Such water-based coatings, nonetheless, still require considerable space and time outlays. Furthermore, water-based coatings promote flash-rusting, in which steel or other iron-based surfaces are oxidized as the water-borne coating is drying. Drying with hot air blowers or the use of vacuum systems may reduce or eliminate the flash rust. However, if the coated items are dried with heat, then there is no added benefit with respect to decreasing energy costs. Furthermore, such thermally-based curing processes may be incompatible when coating objects having thermally-sensitive or flammable components.

Powder coatings are composed of 100% solids material, with no solvents of any kind. All substrate wetting and flow is due to the melt viscosity of the binder at elevated temperature. Solid resin, pigments, curing agents and additives are premixed, melted and dispersed in an extruder between 100° to 130° Celsius. This molten blend is then squeezed into a thin ribbon, cooled, broken into flakes, and then ground into a fine powder.

Powder coatings can be applied using electrostatic deposition. The charged powder particles are attracted to, and uniformly coat, a part that has been grounded. The coated part is moved to an oven in which the powder melts and cures into a thin film. Extrusion thermal stresses and curing using thermo-setting has limited the development of powder coating to those which cure at temperatures below 150° Celsius. Further limitations occur as a result of resin cross-linking within the extruder. The extruder dwell time must thus be limited because such cross-linking can result in increased melt viscosity, more orange peel and possible defects caused by gel particle formation. Also, powder coatings which thermoset at 120° Celsius have cure times of 30–60 minutes. This time is not practical for temperature sensitive materials such as those containing (by way of example only) plastic, rubber or engineered wood components, or in which certain components are flammable or explosive. Furthermore, once the curing process has begun the melt viscosity increases immediately and stops further flow and leveling. Powder coatings can display an "orange peel" appearance which may be undesirable. Flow and leveling takes place within the first 30–90 seconds of cure, and therefore the degree of orange peel and smoothness is set in.

3. UV-curable Powder Coating

Solid resins which possess UV-reactive moieties, and retain the melt and flow characteristics needed to produce high quality coatings, allow for the creation of V-curable powder coatings. These powder coatings combine the low energy, space efficient and fast cure characteristics observed with UV cure liquid coatings, with the convenience of powder coating application. Also, the combination of UV curing with powder coating technologies effectively separates the melt and flow stages from the curing stage. This thermal latency of UV powder coatings allows the coating to flow to maximum smoothness before curing by exposure to UV radiation. Thus, any substrate which withstands temperatures ranging from 100° to 120° Celsius can be coated using UV-curable powder coatings. However, such thermally-based curing processes may be incompatible when coating objects having thermally-sensitive or flammable components.

The powder manufacturing process for thermoset powders or UV cure powders is identical. The significant difference between thermoset powder coatings and UV cure powder coatings is that the applicability of thermoset powder coatings is limited by process, requiring thermal cure temperatures, whereas UV-curable powder coatings have limitations resulting from powder storage conditions.

4. UV-curable Liquid Coating

Contemporary with the development of powder coatings was the development of UV-curable liquid coatings. These coatings utilized low molecular weight unsaturated and acrylated resins in combination with photoinitiators to produce a coating which is cured by radical polymerization when exposed to UV radiation. However, due to the highly viscous nature of these liquid UV coatings, material handling and application of the UV-curable liquid coatings to complex parts can be burdensome and difficult. These coatings often utilize organic solvents to thin/dilute the formulation as a means to effectively apply the coating to a surface. Consequently, the issues associated with the use of organic solvents, such as environmental, health, and monetary considerations, are also of concern with UV-curable liquid coatings.

5. 100% Solids, UV-curable Coating

A need exists for improved 100% solids UV-curable coating compositions which are easily applied to surfaces and cure quickly without the use of large curing and drying ovens; thereby, decreasing production costs associated with owning/leasing space required for drying/curing ovens, along with the cost associated with the energy requirements for operation of drying/curing ovens. In addition, the UV-curable coating compositions should result in a more efficient production process because the use of a single coating (i.e. one-coat finish) decreases the time associated with coating a product and results in immediate "pack and ship" capabilities. In addition, it would be advantageous if the UV-curable coating compositions imparted corrosion resistance, abrasion resistance, improved adhesion, and could be either opaque or clear coat finishes. Such advantageous UV-curable coating compositions should not contain volatile organic solvents, thereby limiting health, safety, and environmental risks posed by such solvents. Further advantages of such UV-curable coating compositions would be the use of solid pigment dispersions, thus limiting the need for "milling," as required with raw pigments. This invention relates generally to the field of coatings for objects comprising thermally sensitive components or which may include flammable or explosive materials; by way of example only, the methods and materials described herein include a composition of matter comprising UV-curable materials, photoinitiators, solid pigment dispersions and filler mixture for the coating of propane tanks, electric motors, appliances and similar articles. This invention relates generally to the field of coatings; by way of example only, the methods and materials described herein include a composition of matter comprising UV-curable material, photoinitiators, fillers, and solid pigment dispersions which may be sprayed by conventional HVLP or electrostatic bell, with no additional heat, applicable in one coat, as a finish for metal.

An object of the invention is increase recyclability of coated articles. In regions of high population density, and high population growth areas, the decrease in potential sites for use as landfills (otherwise known as garbage dumps) is both an economic and environmental benefit. The initial environmental impact of a landfill is the loss of animal habitat; however potential contamination of ground water and increases in air pollution can exist later in a landfill life cycle. Recycling programs have helped to decrease the quantity of articles disposed of in landfills, although painted or coated articles are often thrown away once the paint or coating has come off due to wear or rusting. For instance, by way of example only, barbeque gas tanks are exposed to physical wearing and to a variety of environmental conditions, many of which are conducive to rust formation or coating removal. It is unsafe to use rusting barbeque gas tanks, as there is the potential for leakage and possible explosion. Thus the choice is to dispose of the barbeque gas tank or refurbish it and therefore recycle it. Therefore, a coating which can either extend the life time of a coated article, or which can be applied such that the original coated article is recoated and easily reused/recycled, would provide substantial benefit. The 100% solids, UV-curable coating compositions and methods described herein can be used to coat new articles, plus it can be used to recoat and refurbish used articles, and thus extend the life time of a coated article, or be applied such that the original coated article is recoated and easily reused/recycled.

Another object of the invention is to minimize the need for recoating. Ideally, an original coated article would last indefinitely, however varying physical wear and environmental conditions impart constraints on the coating lifetime. As discussed above, because of these constraints a used coated article can be either disposed of or recycled. Once the coated article has been recoated and recycled, it would be ideal that any future recoating is minimized. Minimizing recoating may not only extend the lifetime of the coated article, and thereby potentially decreasing articles disposed in landfills, it may decrease any costs associated with having to frequently recoat. The 100% solids, UV-curable coating compositions and methods described herein can be used to recoat used coated articles. Prior to this recoating process the used article needs minimal (if any) pretreatment. In one approach, the used article is simply washed with a biodegradable organic cleaner to remove loose impurities, surface soils, oil and grease, rinsed with water, and then dried. After initially recoating a used coated object with the 100% solids, UV-curable coating compositions and methods described herein, the recoated article may be used and washed for up to at least 10 times before further recoating is required. Thus, the 100% solids, UV-curable coating composition described herein may minimize the need for recoating and simplifies the recoating process.

The cleaning regimens used to clean surfaces prior to coating with solvent-based coating compositions generally involves contacting the surface with an alkaline-based cleaner or an acidic cleaner, typically as aqueous solutions. Examples of alkaline cleaning agents include sodium hydroxide and potassium hydroxide. In addition to the cleaning agent and water, the cleaning solution may optionally include surfactants and builders, such as soda ash, pyrophosphate, or tripolyphosphate. Thus, harsh conditions are needed to clean surfaces prior to coating with solvent-based compositions. In contrast, as discussed above, the methods and compositions described herein require limited and simple (if any) cleaning prior to coating an object. In one embodiment, cleaning an article prior to coating with the 100% solids, UV-curable coating compositions described herein simply requires washing with a biodegradable organic cleaner and water to remove loose impurities, surface soils, oil and grease, a water rinse, and drying. The water rinse can use deionized, purified water or tap water, with a contact time and/or water flow rate sufficient to remove substantially all of the cleaner from the surface. The waste stream from this simplified cleaning process contains less toxic and/or harmful materials than the process used for solvent-based coating compositions. Thus, this cleaning process is more environmentally friendly than the process used for solvent-based coating compositions.

Yet another object of the invention is to eliminate the promotion of flash-rusting. Flash-rusting results when steel or other iron-based surfaces are oxidized as the water in water-borne coatings dries. The 100% solids, UV-curable coating compositions described herein does not utilize a solvent, including water, and therefore avoids the potential for flash-rust formation. In addition, the use of a UV-curable composition decreases the curing process time and may avoid flash-rust formation when the UV-curable coating is applied and cured in higher humidity environments. It is possible to reduce or eliminate the formation of flash rust with water-borne coating compositions by drying with hot air blowers or the use of vacuum systems. However, if the coated items are dried with heat, then there is no added benefit with respect to decreasing energy costs or avoiding damage to and/or from thermally sensitive components and materials.

Another object of the invention is to control foaming. Foam is a stable dispersion of a gas in a liquid or solids coating formulation. Typically the gas is air; however the gas can be formed from potential chemical reaction between components of a coating formulation. Air can become incorporated into the composition during several stages of the composition preparation and use; such as during mixing, dispersing, filling, transportation and application of the coating composition. Pure liquids typically don't form foam, and any entrapped air will be released spontaneously as a result of differences in specific gravity. In the presence of surface active components in the formulation, such as emulsifiers, wetting agents and thickeners, air dispersions will be stabilized, thereby creating foam. Thus, optimization of the formulation, the production of the composition, and application process are necessary to reduce the entrapment of air, and subsequent foam formation. However, air entrapment cannot be avoided completely, and anti-foaming agents are needed. Foam control agents are additives that are capable of reducing or suppressing the stabilization of air bubbles and further formation of foam. Foam control agents prevent mottled surface appearance and pinholes, give smooth and beautiful films, and enhance coating durability and gloss value. At the coating composition production stage, they assist in pigment dispersions and lower viscosity. Foam control agents can be classified into three groups: foam breaking agents, anti-foaming agents and deaerators. Foam breaking agents destroy existing stabilized foam and bubbles on the surface of liquid, so they are normally used as post additives. Anti-foaming agents prevent or retard the formation of foam and are mainly used in coating compositions production. Anti-foaming agents prevent foaming of coating compositions in such applications as wool roller painting or air spraying etc. The majority of foam control agents used in the coating industries are anti-foaming agents. Deaerators intensify bubble coalescence and accelerate foam release from liquid. Deaerators prevent under filling and air entrapment in high-build and viscous coating compositions. A foam control agent often performs foam breaking, anti-foaming and deaerating actions at the same time, so it is not always possible to classify it into one group. But these three functions should be taken into account in selection of foam control agents. The efficiency of anti-foaming agents depends on their ability to spread throughout the media and the ability to penetrate into the foam. Anti-foaming agents can be diverse, although they can be typically characterized as hydrophobic compounds. Hydrophobic components are considered among the most active anti-foaming agents, as they destabilize the foam dispersion by displacing the stabilizing surface-active components in the formulation. Also, hydrophobic components prevent the formation of stable interfacial surfaces between air/liquid. Consequently, the air bubble can penetrate the interface and release itself or it can form a bigger, less stable, air bubble by coalescing with another air bubble. Typical hydrophobic components are mostly solids, such as silicas, polyamides and waxes. The sensitivity of the paint film to generate surface defects is important when choosing the right anti-foaming agent. In highly pigmented systems, a silicone-based and weak emulsifying anti-foaming agent may be chosen. Traditional anti-foaming agents such as silicones may cause agglomeration of fillers or compromise adhesion. The 100% solids, UV-curable coating compositions described herein use a combination of treated silicas to modify flow characteristics in such a way as to limit the incorporation of air. In addition, the monomer is chosen to control viscosity a further assists in limiting the incorporation of air enhances, thereby minimizing the conventional drawbacks of defoamers. Therefore, the 100% solids, UV-curable coating compositions described herein effectively control foam, ensuring efficient coverage of the coating on thermally sensitive objects, such as, by way of example only, tanks for holding gases, or articles comprising o-rings or plastic sleeves.

The term "thermally sensitive object" as used herein refers to any object which comprises a component which degrades, decomposes, or otherwise deteriorates at a critical temperature; or an object which contains a component which presents a hazard (including flammability and/or explosion hazards) when heated to a critical temperature; and/or an object which contains materials with different thermal expansion coefficients so that heating such objects to a critical temperature can harm the utility or appearance of the object. In one embodiment the critical temperature is at least 100° C., while in another embodiment the critical temperature at least 90° C. In a still further embodiment, the critical temperature is at least 80° C. In a further embodiment, the critical temperature is at least 70° C., and in another embodiment the critical temperature is at least 60° C. In a still further embodiment, the critical temperature is at least 50° C.

Metal surfaces, in particular ferrous metals and alloys such as steel, are easily oxidized to form surface oxides, herein referred to as rust, surface oxides or metal oxides. However, other metal such as brass, bronze, aluminum, cobalt, copper, magnesium, nickel, titanium, tin or zinc, or alloys comprising aluminum, iron, cobalt, copper, magnesium, nickel, titanium, tin and/or zinc also oxidize and form their corresponding surface oxides. Rust formation becomes even more likely and occurs more quickly in environments having high humidity or salt content. Thus some protective coating is needed to minimize the formation of surface oxides on metal surfaces. The 100% solids, UV-curable coating compositions described herein can be used to coat new, pristine metal surfaces, including such metals as iron, brass, bronze, aluminum, cobalt, copper, magnesium, nickel, titanium, tin or zinc, or alloys comprising aluminum, iron, cobalt, copper, magnesium, nickel, titanium, tin and/or zinc, plus galvanized steel, and electrogalvanized steel. However, another object of the invention is to cover rust and thereby refurbish the surface and minimize further surface oxidation. The compositions described herein exhibit adhesion on regions of rust, as well as adjacent non-oxidized areas. Thus, the rust may not spread under the coating and create a blister. In addition, the resulting coating is tough, glossy, and tightly adhering, and may provide increased protection for the coated metal. Furthermore, with the ability to coat directly over rust while maintaining excellent adhesion and gloss, the use of the coating compositions described herein may eliminate the labor usually required to remove rust prior to coating. Such surface preparation methods are wire brushing, sandpapering, or sandblasting which are often used to remove rust and to roughen the metal for better adhesion. Although these cleaning methods may be used with the coating compositions described herein, it is not necessary to use them.

As discussed the compositions described can be used to coat metals. The metals to be coated can be any known form of metal, such as cold-rolled metal, extrusions, coil, welded parts, or cast parts. However, the compositions may be used to coat over other materials such as glass, plastic, ceramic and paper. These materials may be incorporated into a newly manufactured article and the compositions described herein are used to coat these new articles of manufacture. The terms "newly manufactured article" or "new articles of manufacture" both refer to articles of manufacture which have not been used by a consumer. Alternatively, the compositions described herein may be used to recoat used articles of manufacture, and thereby refurbish the used articles of manufacture such that they may be recycled. The term "used articles of manufacture" refers to articles of manufacture which have been used by a consumer or other end user. The surfaces of the used articles of manufacture may have been previously coated or uncoated prior to coating with the compositions described herein. The used articles of manufacture may be cleaned prior to recoating; however cleaning is not necessary. In addition, the compositions can be used to coat and/or recoat directly over markings on the used articles designated for recycling. Such markings may be, by way of example only, labels, which may include, but are not limited to, adhering labels, stenciled labels, and hand-written labels. Therefore, a further object of the invention is to cover labels, such as, by way of example only, the labels remaining on barbeque gas tanks after cleaning. The labels do not need to be removed, and the compositions can be applied directly over the label while continuing to exhibit improved adhesion, gloss and corrosion resistance characteristics.

The present invention provides sprayable, ultraviolet light curable, 100% solids compositions of matter comprising UV-curable material, photoinitiators, fillers, and solid pigment polymerizable dispersions for applying to metal substrates or other surfaces to produce an opaque coating. The composition is especially advantageous in that it produces opaque, corrosion resistant, UV-curable coatings without the use of milling and with no addition of vehicle. In addition, the compositions described herein have a relatively high rate of through-cure and high gloss.

Milling refers to the powder manufacture processes of premixing, melting and grinding the powder coating formulation to obtain a powder suitable for spraying onto a surface. The addition of these steps to the coating process results in increased time and energy expenditures per article of manufacture coated. Removal of these steps streamlines the coating process and removes the associated milling costs, thus improving overall productivity and lowering business expenditures. As described herein, the replacement of pigment dispersions with polymerizable pigment dispersions, as well as the incorporation of adhesion promoter components, is an effective approach for creating opaque, corrosion resistant, UV-curable compositions and/or coatings without the need for milling.

In general, solvent-based coating formulations incorporate four basic types of materials: pigment, resin (binder), solvent, and additives. The liquid portion of these formulations is called the "vehicle," and can involve both the solvent and the resin. Homogeneous pigment dispersions can be created by efficient mixing of insoluble pigment particle in the vehicle, and thereby create opaque coatings. The resin makes up the non-volatile portion of the vehicle, and aids in adhesion, determines coating cohesiveness, affects gloss, and provides resistance to chemicals, water, and acids/bases. Three types of resins are generally used: multiuse resins (acrylics, vinyls, urethanes, polyesters); thermoset resins (alkyds, epoxides); and oils. The type of solvent used in these formulations depends on the resin and are either an organic solvent (such as alcohols, esters, ketones, glycol ethers, methylene chloride, trichloroethane, and petroleum distillates), or water. The significant drawback associated with the use of these types of formulations results from the use of volatile solvents as part of the formulation vehicle. Although the low vapor pressure of the organic solvent is the characteristic desired to create coatings using these formulations, the corresponding solvent evaporation creates environmental, fire hazard, and worker health issues. Even the use of water, although not generally a fire hazard or having environmental or health issues, can create undesirable effects, such as flash rusting of metal surfaces. As described herein, the compositions and methods are 100% solids, thus eliminating the undesirable aspects of the vehicle found in typical coating formulations. In this regard, another object is to reduce emissions. Therefore, by using various higher vapor pressure resins as the composition vehicle, the use of a solvent is removed, and the associated solvent emission/evaporation issues are overcome.

A further object of the invention is to reduce or eliminate the need for emissions control. As discussed above, the UV-curable coating compositions and methods described herein are environmentally friendly because solvents have been removed from the composition. This effectively decreases the corresponding solvent emissions, and obviates the need to incorporate air pollution control technology into the manufacturing process. As a result, the methods and compositions described herein can minimize the time, space and money for maintenance of air pollution control systems in an operation in which a coating step is integrated.

An object of the invention is to save production time by decreasing or cutting production time. An additional advantage resulting from using the methods and compositions described herein is that such compositions and methods result in the overall decrease in time required to apply, cure, and dry the coating. Although, conventional coating processes can be adapted to the coating compositions and methods described herein, the use of UV radiation, rather than heat, to initiate the polymerization process significantly decreases the curing time per article coated. However, the methods and compositions described herein may include low amounts of heat; for example, lamps used to provide the UV light for curing may also generate some heat. In addition, heat may be generated from other sources (including the ambient temperature of a facility); however, the methods and compositions described herein require minimal, if any, additional heat in order to achieve appropriate curing. Thus, the lack of solvent in the present compositions and methods removes the requirement for using heat to drive off solvent, a process which adds significant time and cost to the coating procedure. The use of UV light for curing, and the removal of solvent from the composition, dramatically decreases the time for completion of the total coating process for each article coated. Thus, the overall production time per part is decreased, and this can manifest itself in two ways. First, more parts can be processed in the same time needed for solvent-based methods, and second, fulfilling batch orders requires less time and therefore the costs associated with maintaining the production line will be lower.

Still yet another object of the invention is to save production space, or alternatively stated, another object of the invention is to utilize less space. Each of these aspects has unique benefits depending on whether an existing production line is modified, or a new production line is being designed. The ability to minimize the usage of space for production, whether it be floor space, wall space, or even ceiling space (in the situation when objects are hung from the ceiling), can be critical in terms of productivity, production costs and initial capital expenditure. The removal of the solvent from the UV-curable compositions described herein allows for the removal of large ovens from the production line. These ovens are used to cure and force the rapid evaporation of the solvent when using solvent-based coating compositions. Removing the ovens significantly decreases the volume (floor, wall, and ceiling space) required for the production system, and in effect utilizes less space for existing production lines. Furthermore, the expense associated with operating the ovens is no longer an issue and the result is decreased production costs. For new production lines, removal of these ovens from the design actually saves space, and hence a smaller building may be used to house the production line, thereby decreasing the construction costs. In addition, the capital expenditure for the new production line will be less because ovens are no longer required. Removal of the ovens results in one feature which is common to both saving space and utilizing less space; i.e., when a given specific volume (floor, wall, and ceiling space) is to be utilized for production. Thus, the methods and compositions described herein allow additional production lines per unit volume, and therefore increase productivity. That is, by utilizing less space in a pre-existing facility, multiple coating assembly lines may be housed in the space required by conventional, thermal-based assemblies.

Another aspect associated with the coating production lines described herein is that the lower spatial requirements of the coating methods and compositions described herein can be integrated with the associated production line for an article of manufacture. For instance, with the removal of large ovens associated with thermal-cure processes, streamlined coating production lines can be inserted into, by way of example only, the production line of a gas tank, including the production line for appliances, electric motors, barbeque propane tanks, industrial nitrogen tanks, or portable camp stove cylinders, and the like.

Another object of the invention is to save energy. As noted above, coating compositions which are solvent-based, whether organic solvent or aqueous based, require the use of heat to dry the coated surfaces and thereby force the evaporation of the solvent. Large ovens are used to accomplish this process, and it can be appreciated that there is a large cost associated with operating these ovens. Furthermore, the use of ventilation systems (for instance large fans), and air pollution control systems all require energy to operate. Therefore, the UV-curable coatings, compositions and methods described herein create significant energy savings by limiting (or eliminating) the need for large ovens, associated ventilation systems and air purification systems required for alternative thermal or solvent-based coating compositions and methods.

Another object of the invention is to provide cost savings. The various beneficial aspects obtained from the use of the UV-curable coating compositions and methods described herein have been discussed; in particular removal of solvents and the associated emissions, which allows for the removal of drying ovens, ventilation systems, and air pollution control systems from the manufacturing process, also allows for less manufacturing space. As a result, a cost savings is expected to be associated with the use of the UV-curable coating compositions and methods described herein.

Yet another object of the invention is to improve color reproducibility and stability. Pigment color properties such as strength, transparency/opacity, glosses, shade, rheology, and light and chemical stability, are generally affected to a greater or lesser extent by the size and distribution of the pigment particles in the vehicle in which they are embedded. Pigment particles normally exist in the form of primary particles (50 μm to 500 μm), aggregates, agglomerates and flocculates. Primary particles are individual crystals, whereas aggregate are collections of primary particles bound together at their crystal faces, and agglomerates are a looser type of arrangement with primary particles and aggregates joined at corners and edges. Flocculates consist of primary particle aggregates and agglomerates generally arranged in a fairly open structure, which can be broken down in shear. However, after the shear is removed, or a dispersion is allowed to stand undisturbed, the flocculates can reform. The relationship between pigment particle size and the ability of a pigment vehicle system to absorb visible electromagnetic radiation is referred to as the color or tinctorial strength. The ability of a given pigment to absorb light (tinctorial strength) increases with decreasing particle diameter, and accordingly increased surface area. Thus, the ability to maintain the pigment at a minimum pigment particle size will yield a maximum tinctorial strength. The primary purpose of a dispersion is to break down pigment aggregates and agglomerates into the primary particles, and therefore achieve optimal benefits of a pigment both visually and economically. When used in a coating composition pigment dispersions exhibit increased tinctorial strength and provide enhanced gloss. However, of concern in obtaining an optimal dispersion is the number of processes involved in creating the pigment dispersion, such as agitating, shearing, milling, and grinding. If these processes are not accurately controlled then the possibility exists for batch-to-batch color variation and poor color reproducibility. Alternatively, polymerizable pigment dispersions, which exhibit minimal aggregation and agglomeration, are simply mixed into the coating composition and thereby improve color reproducibility by removing the need for these processes in the manufacturing and/or coating process. Furthermore, due to the reactive functionality of the polymerizable pigment dispersion, during polymerization the pigment becomes an integral part of the resulting coating because it is attached to the reactive functionality. This may impart greater color stability relative to pigment dispersions which simply entrap the pigment particles in the coating matrix. Thus, coatings which incorporate polymerizable pigment dispersions exhibit improved color reproducibility, and improved color stability, greater tinctorial strength and enhanced opacity and gloss. By way of example only, compositions described herein are heavily pigmented and can exhibit acceptable opacity at thicknesses less than 50 microns.

Further it enables the user to decrease production time while producing a product with superior, more reproducible appearance. Gloss essentially refers to the smoothness and shine of a surface, and both of these properties are important when considering the visual appearance and ultimate visual acceptability of a coating. As discussed above, the incorporation of polymerizable pigment dispersions into the coating composition can yield greater tinctorial strength and enhanced gloss. Furthermore, the incorporation of fillers in the coating composition, along with controlled polymerization conditions, can impart enhanced smoothness. The control of the polymerization process will be described in detail later, briefly however, it involves the use of mixtures of photoinitiators which possess different absorbance characteristics such that longer wavelength radiation can be used to excite a photoinitiator or photoinitiators of the mixture, while shorter wavelength radiation is used to excite the other photoinitiators of the mixture. In this manner, the order of excitation can be important. It is desirable that the longer wavelength photoinitiators are excited first, as this allows for improved adhesion and traps the filler components in place. The shorter wavelengths photoinitiators are then excited to complete the polymerization process. If this order of excitation is not used (or a variant thereof, such as alternating exposures, flashing or other sequences) the filler compounds can aggregate and create a matted finish. Thus, the long wavelength-short wavelength procedure can improve visual appearance and acceptability by enhancing the surface smoothness, enhancing the surface shine, or enhancing the surface smoothness and surface shine. However, if a matted appearance is desired, then a short wavelength-long wavelength procedure may be used.

Another object of the invention is to produce opaque, corrosion resistant coatings which may be applied to metals in one coat. It is evident that there is considerable benefit to having a coating composition and process which requires only a single coating step. This is cost effective in terms of the amount of coating composition used, as well as with the overall production time per item coated. Clearly, the more a part needs to be handled prior to becoming a finished product, the more costly it is to produce and therefore, the earnings margins may be lower. Obviously, the coating composition must still impart beneficial qualities, such as corrosion resistance, when applied as a single coat. The UV-curable coating compositions described herein utilize fillers in the mixture of oligomers, monomers, polymerizable pigment dispersion, and photoinitiators to impart desirable rheological characteristics to the resulting film that is applied to the surface prior to exposure to UV radiation. These rheological properties include viscosity and thixotropic behavior, which allows the composition to be sprayed onto a surface, allows the composition to remain where it lands on the surface, and allows the composition droplets to flow together and fill in any gaps without dripping or running off the surface, thereby creating a complete, near pinhole-free film on the surface. Thus, another object of the invention is to improve coating coverage. Such control of the rheological properties of the UV-curable coating composition contributes to the ability of the coating procedure to obtain improved coverage in a single application step.

Still yet another object of the invention is to produce a product that can be applied to a surface by HVLP or electrostatic bell without the use of any heating apparatus. The UV-curable coating compositions described herein can be applied to surfaces by spraying, curtain coating, dipping, rolling or brushing. However, spraying is the one of the most efficient methods of application, and this can be accomplished using High Volume Low Pressure (HVLP) methodology or electrostatic spraying technology. HVLP and electrostatic spraying techniques are methods well established in the coating industry, thus it is adventitious to develop coating compositions which utilize these application means.

In addition, the UV-curable compositions described herein may be applied using air-assisted/airless type spraying technology. Air-assisted airless pumps are usually air-operated, positive displacement, reciprocating piston pumps that siphon coating compositions directly out of a container. They require an air compressor for operating both the pump and the gun, although some systems can operate on as little as 5 cubic feet per minute (cfm) from a 1.5 HP compressor. This is about one-quarter the amount of air needed for a conversion HVLP gun, and the fluid is delivered at a significantly higher fluid pressure, 300–600 psi. The coating composition atomizes as it escapes to atmospheric pressure, and the gun then adds a little bit of air (about 2 cfm) to the ends of the spray pattern, eliminating the "tails" or heavy edges, thereby minimizing overlapping lines or stripes. Thus, the "air assist" of the "airless" process.

The coating compositions described herein are UV-curable, and there is no need for a heating apparatus to assist in curing. A significant benefit to curing without requiring any heating apparatus is that thermally sensitive objects can be coated and UV cured without causing thermal damage. For instance metal objects with incorporated thermally sensitive plastic or rubber components are difficult to heat cure due to potential damage to the plastic or rubber. However, coating and UV curing the UV-curable composition reduces or eliminates this problem. In addition, virtually any thermally sensitive object can be coated using the UV-curable coating compositions described herein. Such thermally sensitive objects include, by way of example only, gas tanks used for barbeques, gas cylinders used for barbeques, gas tanks for liquid natural gas, and gas tanks used for industrial gases, such as nitrogen, argon, oxygen and the like.

Recoating thermally sensitive object using solvent-based coating compositions and thermal curing is problematic, both logistically and for safety reasons. Thermally sensitive objects which can be coated using the UV-curable coating compositions described herein may include, by way of example only, plastics, or metal objects with incorporated thermally sensitive plastic or rubber components. In addition, by way of example only, gas tanks, such as those described above, contain seals used to stop leakage of the contents of the tanks. These seals are thermally sensitive, such that recoating with solvent-based coating compositions and thermal curing may result in damage to the seal, thereby causing a future leakage problem. Thus logistically, the seals need to be removed prior to recoating gas tanks with solvent-based coating and curing using thermal curing methods. This process is time consuming, and may result in seal damage. Replacement with a new seal then adds extra expense to the process. In addition, it must be ensured that the contents of the gas tank are removed prior to thermal curing a recoated gas tanks. This is a particular safety issue for explosive or toxic gases and liquids stored in the tanks, or potential explosion from expansion in a closed container. The UV-curable coating compositions described herein do not use thermal curing and thereby reduce or eliminate the aforementioned hazards.

Sprayable UV-curable finishing compositions were described in U.S. Pat. No. 5,453,451. These coatings, while intended to reduce emissions, were not formulated to prevent corrosion or produce a one-coat finish. Some photoinitiators, co-initiators as well as the fillers necessary to achieve a sprayable, opaque, one-coat finish of suitable viscosity were not included. Solid pigment dispersions were not used. Solid pigment dispersions are described in U.S. Pat. No. 4,234,466. While color matching panels, cured by UV light, were described, the intended usage was for the coloring of plastic and powdery paints. Combinations of specialized fillers were not described. Wax coated silica matting agents are described in U.S. Pat. No. 6,039,798. These agents have been used in 3–8% to produce a matting effect. They have not been used in small quantities to affect coverage, foaming, or flow characteristics. They have not been combined with silicas with other organic treatments. As illustrated in the online edition of Industrial Paint and Powder Magazine, "Faster, Friendlier, and Fewer Rejects," by Dennis Kaminski, posted Apr. 28, 2004, it has been accepted wisdom that pigmented UV coatings are high viscosity, requiring heated recycling. Raw pigments are difficult to disperse in these high viscosity coatings and have required milling. Pigment dispersions in solvents have been used, but they added to emissions. Pigment dispersions in reactive diluents have been used, but have been difficult to use in quantities sufficient to provide sufficient pigmentation for coverage in one coat. A 100% solids UV cured composition, sprayable at room temperature and providing complete one-coat coverage has not been available.

Prior to this composition, if one wished to apply a corrosion resistant coating to propane tanks, electric motors, appliances and similar articles, one had several choices. One could have used a conventional solvent-borne coating, resulting in increased emissions. One could have used a waterborne coating, resulting in higher production time and/or higher energy and space requirements as well as possible flash-rusting. One could have used powder, with increased use of space and energy as well as an orange-peel appearance. Powder can also not be used for the refurbishing of electric motors, appliances, propane tanks and similar articles, because the heat required for curing attacks rubber seals in the tanks. Less common alternatives were e-coats, which required considerable space and energy and finally electron beam curing, which required high energy and extensive safety shielding. One could also have used existing UV-curable coatings which would have required heating and special spray equipment. An additional problem with such UV-curable coatings is increased energy usage through heat. Such heating and/or temperature cycling may cause breakdown in some UV-curable components, especially epoxy acrylates. Heat may also cause unwanted temperature cycling may cause breakdown in some UV-curable components, especially epoxy acrylates. Heat may also cause unwanted polymerization due to inhibitor loss. UV-curable pigmented coatings may require milling, and thus increased production time. Further, color control is not always precise and stable. Use of the compositions and methods described herein reduces emissions, reduces space and production time requirements, and reduces energy usage as compared to previous technologies. In addition, since no heat is used, breakdown and undesirable polymerization are not a concern.

It is customary that metals be coated. Desirable coatings prevent corrosion as well as producing an attractive appearance. Historically, metals have been coated primarily by solventborne paints, powder, or waterborne paints. More recently, ultraviolet curable coatings, especially clear hardcoats have been used. All of these technologies have their flaws. Solventborne paints often show superior performance, but produce undesirable emissions. They also require time, space and energy to cure. Use of powder may decrease emissions, but also requires considerable time, space, and energy to cure. Powder coatings also often display an "orange peel" appearance that may be undesirable. Waterborne paints may decrease emissions and energy usage. Waterbornes still require considerable space and time, especially if air drying is used. In addition they may promote flash-rusting and have other performance characteristics inferior to other technologies. The use of UV curing eliminates many emissions, saves space, and decreases both production time and energy usage. However, opaque UV-curable coatings have not been available with the spraying characteristics and corrosion resistance that industry requires. Previously, 100% solids UV-curable coatings have also shown poor wetting of pigments, causing an undesirable appearance.

Described herein are improved sprayable, 100% solids compositions, methods of using the compositions for coating surfaces, and the processes of coating surfaces. More particularly, described herein are compositions which are comprised of actinic radiation curable material, photoinitiators, fillers, and polymerizable pigment dispersions, and which may be applied in a single coat by conventional methods, including, but not limited to, High Volume Low Pressure (HVLP), air-assisted/airless, or electrostatic bell, with no additional heat.

The present invention provides sprayable, ultraviolet-light curable, 100% solids compositions of matter comprising UV-curable material, photoinitiators, and solid pigment polymerizable dispersions for applying to thermally sensitive substrates or metal substrates in contact with thermally sensitive components, to produce an opaque, corrosion resistance coating. The compositions are especially advantageous in that they produce opaque, corrosion resistant, UV-curable coatings without the use of milling and with no addition of vehicle (i.e. the use of a solvent). The characteristics of the compositions are that they have zero VOC's, zero HAP's, cure in seconds, for example, but not limited to, 1.5 seconds, (thereby decreasing cure time by 99%), require up to 80% less floor space, require up to 80% less energy, are non-flammable, require no thinning, are extremely durable, are high gloss, applied using HVLP or electrostatic bell, do not require flash off ovens, do not require thermal cure, have no thermal stress and no orange peel effect. Further, they enable the user to decrease production time while producing a product with superior, more reproducible appearance. The user stands to save time, energy, and space. In addition, the user may reduce or eliminate emissions as no solvent or vehicles are used.

The present invention also provides processes and assemblages for applying sprayable, ultraviolet light curable, 100% solids. The characteristics of the processes are that they provide an industrial strength coating, have up to 98% reclamation of overspray, no cooling line required, immediate "pack and ship," decreased parts in process, less workholders, no workholder burn off, eliminate air pollution control systems, safer for the environment, safer for employees, decreased production costs, decreased production time, and increased production.

Testing the Coated Surface

The 100% solids, UV-curable coating described herein has excellent durability and may be particularly suitable for surfaces which encounter physical wearing or exposure to various weather conditions such as, by way of example only, high humidity, rain or high temperature. The coatings, compositions and methods described herein meet and exceed the requirements for at least one of the following tests, in some instances more than one of these tests, and in other instances all these tests. The descriptions for the following tests are provided by way of example only.

For example, the compositions and methods described herein provide an improved cured coating that exhibits improvement in at least one of the following tests: scrub resistance, impact resistance, corrosion resistance, flash rust resistance, gloss (higher), exterior durability such as gloss retention, cracking resistance, and adhesion to substrates.

Scrub resistance testing is an accelerated procedure for determining the resistance of paints to erosion caused by rubbing. Although scrub resistance tests are intended primarily for interior coatings, they are sometimes used with exterior coatings as an additional measure of film performance. In a typical scrub test, the coating is applied to a Scrub Test Panel at a specified film thickness, cured, and then subjected to scrubbing with a straight-line scrub tester. The scrub resistance is the number of scrub cycles required to remove the coating to a specified end point. Alternatively, the loss in weight is determined after a specified number of scrub cycles as a measure of scrub resistance, with calculation of equivalent loss in film thickness.

Impact resistance is a traditional method for evaluating the impact strength or toughness of a coating to a falling object. The test can use a single object (dart) shape at a single drop height, while varying the weight of the dart. The dart size and the drop height are chosen depending upon the expected impact strength of the test sample. A number of test samples are impacted to determine an appropriate starting point for the weight of the dart. The test specimen is clamped securely in a pneumatic ring at the base of the drop tower. The mounting bracket is adjusted to the appropriate drop height, and the dart is inserted into the bracket. The dart is released and dropped onto the center of the test specimen. A series of 20 to 25 impacts are conducted, and if a test specimen passes, the drop weight is increased by one unit. If a test specimen fails, the drop weight is decreased by one unit. Alternatively, panels are tested using progressively increasing drop heights in order to determine the minimum drop height that gives rise to any cracking or peeling from the substrate. The results from these impacts are used to calculate the Impact Failure Weight—the point at which 50% of the test specimens will fail under the impact. Typically the dart is a rounded object with a diameter ranging from 38 mm (1.5 inches) to 51 mm (2 inches) and is dropped from about 0.66 meters (26 inches) 1.5 meters (60 inches).

For coatings to perform satisfactorily, they must adhere to the substrates on which they are applied. A variety of methods can be used to determine how well a coating is adheres to a surface. Commonly used evaluation techniques are performed using a knife or a pull-off adhesion tester. The knife test is a simple test requiring the use of a utility knife to pick at the coating. It establishes whether the adhesion of a coating to a substrate, or to another coating (in multi-coat systems), is at a generally adequate level. Performance is based on both the degree of difficulty to remove the coating from the substrate and the size of removed coating. Alternatively, an "X" is cut into the coating down to the surface, using the knife and cutting guide, by making two cuts at a 30–45 degree angle which intersects to form the "X" shape. At the vertex, the point of the knife is used to attempt to lift up the coating from the substrate or from the coating below.

A more formal version of the knife test is the tape test, which can be conducted with or without humidity. Incorporation of humidity to the tape adhesion/peel back test determines how the adhesive properties of the coating behave under conditions in which corrosion may occur. Pressure sensitive tape is applied and removed over cuts made in the coating. There are two variants of this test; the X-cut tape test and the cross hatch tape test. The X-cut tape test uses a sharp razor blade, scalpel, knife or other cutting device, to make two cuts into the coating down to the substrate with a 30–45 degree angle which intersects to form an "X". A straightedge is used to ensure straight cuts are made. Tape is placed on the center of the intersection of the cuts and then removed rapidly. The X-cut area is then inspected for removal of coating from the substrate or previous coating and rated. Alternatively, the cross hatch tape test is primarily intended for testing coatings less than 5 mils (125 microns) thick. It uses a cross-hatch pattern rather than the X pattern. The cross-hatch pattern is obtained by using a cutting guide or a special cross-hatch cutter with multiple preset blades to make sure the incisions are properly spaced and parallel. Tape is then applied and pulled off; the cut area is then inspected and rated.

A more quantitative test for adhesion is the pull-off test where a loading fixture, commonly called a dolly or stub, is affixed by an adhesive to a coating. By use of a portable pull-off adhesion tester, a load is increasingly applied to the surface until the dolly is pulled off. The force required to pull the dolly off, or the force the dolly withstood, yields the tensile strength in pounds per square inch (psi) or mega Pascals (MPa). Failure will occur along the weakest plane within the system comprised of the dolly, adhesive, coating system, and substrate, and will be exposed by the fracture surface. This test method maximizes tensile stress as compared to the shear stress applied by other methods, such as scrape or knife adhesion, and results may not be comparable. The scrape test is typically limited to testing on smooth, flat surfaces. Adhesion is determined by pushing the coated surfaces beneath a rounded stylus or loop that is loaded in increasing amounts until the coating is removed from the substrate surface.

Adhesion is also a measurable result of some hardness tests made by pencil hardness, gravelometer, impact (falling object, etc.) or mandrel bend as indicated by chipping off of the coating. Finally, loss of adhesion can be noted during some chemical resistance tests where the coating blisters, bubbles up or even falls off.

There are a variety of corrosion resistance requirements which an effective coating must fulfill. The corrosion resistance testing evaluations include: salt spray, scab, and cycle corrosion evaluations and any associated creepback. The testing method for evaluating salt spray corrosion involves mounting the test panels in a temperature-controlled chamber, and then spraying the test panel with an aqueous solution of salt or salt mixtures in the form of a fine aerosol. Typically, the solution is a 5% salt (sodium chloride) solution, although the methods can vary according to chamber temperature and the composition of the salt solution. The test panels are inserted into the chamber and the salt solution is sprayed as a very fine fog mist over the samples at a constant temperature. Since the spray is continual, the samples are constantly wet, and thus, constantly subject to corrosion. The samples may be rotated frequently to ensure uniform exposure to the salt spray mist. Test duration can be from 24 to 480 hours, or longer. Enhanced corrosion resistance may be evidenced by exposure of a test panel for at least 400 hours without developing any significant evidence of under-film corrosion, such as blistering or other changes in appearance which may result from pin holes in the coating. In general, the maximum allowable creepback is 2–4 mm along with at least less than 10% of the surface being corroded within 2–4 mm of sharp edges. A more rigorous test involves exposure for at least 900 hours without developing any significant evidence of under-film corrosion, such as blistering or other changes in appearance, with the maximum allowable creepback being 2–4 mm and at least less than 10% of the surface being corroded within 2–4 mm of sharp edges.

Scab corrosion testing involves the use of the salt spray procedure however the test panel is scribed such that a scratch is created in the coating. Scab-like corrosion then occurs along the scratch in a coating and manifests itself as a blister like appearance emanating away from the scratch. Enhanced corrosion resistance for scab corrosion may be demonstrated in that after 1 week the test panel exhibits no blistering or surface corrosion, or other change in appearance, with is a maximum creepback of up to 2 mm, and at least less than 10% of the surface is corroded within 3 mm of sharp edges. A more rigorous test involves exposure of a scribed test panel for up to 2 weeks without showing evidence of scab corrosion.

Evaluation of coated surfaces using procedures that involve continual exposure to moisture (as occurs in the salt spray test) may not emulate realistic conditions experienced by the coated surface, which in reality will experience periods of wet and dry environments. Therefore evaluation of a coating using wet/dry cycles, with and without salt spray during the wet cycle, is a more realistic evaluation for daily use of a coating. The continual wetness during the salt spray test does not allow this passive oxide layer to develop.

Along with corrosion testing, a coating undergoes a number of other evaluation criteria, resistance to chipping evaluation, thermal shock testing, and in the case of coatings barbeque gas tanks, resistance to hot oil or grease splatter.

Resistance to chipping testing is primarily used to simulate the effects of the impact of flying debris on the coating of a surface. Typically a Gravelometer, which has been designed to evaluate the resistance of surface coatings (paint, clear coats, metallic plating, etc.) to chipping caused by the impacts of gravel or other flying objects. In general, the test sample is mounted in the back of the Gravelometer, and air pressure is used to hurl approximately 300 pieces of gravel, hexagonal metal nuts, or other angled objects at the test panel. The test sample is then removed, gently wiped with a clean cloth, and then tape is applied to the entire tested surface. Removal of the tape then pulls off any loose fragments of the coating. The appearance of the tested sample is then compared to standards to determine the chipping ratings, or visual examination can also be used. Chipping ratings consist of a number which designates the number of chips observed.

A "cure" test is used to evaluate completeness of curing, the coating adhesion strength to the surface, and solvent resistance. The procedure used is to take a test panel, coat it with the test sample and then cure according using the cure method of choice, such as actinic radiation. The coated and cured test panel is then subject to rubbing to evaluate the number of rubs needed to expose the surface. Failure normally is determined by a breakthrough to the substrate surface. Generally, the cloth used to rub the surface is also soaked in an organic solvent such as methyl ethyl ketone (MEK) as a means to accelerate testing conditions and test for stability to solvent exposure. One rub is considered to be one back and forth cycle, and highly solvent resistant coating achieve a rating of more than 100 double rubs. In addition, a secondary reading for the cure test may also be obtained by determining at what point a marring of the surface occurs.

For evaluation of the heat resistance of a coating, a coated test panel is placed in an oven and evaluated for loss of adhesion, cracking, crazing, fading, hazing, or fogging after various periods of thermal exposure. The types of ovens used include, but are not limited to, convection ovens. The UV-curable, corrosion resistant coating described herein may meet or exceed requirements for heat resistance with no loss of adhesion and no cracking, crazing, fading, hazing, or fogging after least 1 hour held at, at least 210° C., and at least 10 hrs held at, at least 210° C.

Thermal shock testing is the most strenuous temperature test, designed to show how the product will perform as it expands and contracts under extreme conditions. Thermal shock testing creates an environment that will show in a short period of time how a coating would behave under adverse conditions throughout years of change. Several variants of testing include the resiliency of a coating to rapidly changing temperatures, such as that experienced in winter when moving from a warm environment, such as a house, garage or warehouse, into the freezing, cold environment outside, or vice versa. Such thermal shock tests have a rapid thermal ramp rate (30° C. per minute) and can be either air-to-air or liquid-to-liquid shock tests. Thermal Shock Testing is at the more severe end on the scale of temperature tests and is used for testing coatings, packaging, aircraft parts, military hardware or electronics destined to rugged duty. Most test items undergo air-to-air thermal shock testing where the test product moves from one extreme atmospheric temperature to another via mechanical means. Fully enclosed thermal shock test chambers can be used to avoid unintended exposure to ambient temperature, whereby minimizing the thermal shock. In Thermal Shock testing the cold zone of the chamber can be maintained at −54° C. (−65° F.) and the hot zone can be set for 160° C. (320° F.). The test panels is held at each stage for at least an hour and then moved back and forth between stages in a large number of cycles. The number of Thermal Shock cycles can vary from 10 or 20 cycles, up to 1500 cycles. The UV-curable, corrosion resistant coating described herein may meet and exceed the Thermal Shock testing requirement in which no loss of adhesion, cracking, crazing, fading, hazing, or fogging is observed for up to 20 cycles.

In the case of coatings used for gas tanks in the barbeque industry, the resistance to hot oil or grease splatter is of interest, as it is very likely the coated surface will come into contact with any of these fluids throughout the lifetime of the gas tank. The test for resistance to hot oil or grease splatter is an immersion test which involves dipping the coated test panel into a bath containing the liquid of interest, which is maintained at various temperatures depending on the specific requirements used for evaluation. After removing the test panel a thumbnail under pressure is dragged across the surface and the presence of any visible defects, such as color change or paint removal to underlying surfaces, or lifting or peeling of paint film are noted. Typical evaluation conditions include immersion for, at least 5 minutes at 100° C., with more rigorous testing involving immersion for 30 minutes at 100° C.

Compositions

As used herein, the term "actinic radiation," refers to any radiation source which can produce polymerization reactions, such as, by way of example only, ultraviolet radiation, near ultraviolet radiation, and visible light.

The term "cure," as used herein, refers to polymerization, at least in part, of a coating composition.

The term "curable," as used herein, refers to a coating composition which is able to polymerize at least in part.

The term "curing booster", as used herein, refers to an agent or agents which boost or otherwise enhance, or partially enhance, the curing process.

The term "filler" refers to a relatively inert substance, added to modify the physical, mechanical, thermal, or electrical properties of a coating. In addition fillers are used to reduce costs.

The term "irradiating," as used herein, refers to exposing a surface to actinic radiation.

The term "co-photoinitiator," as used herein, refers to a photoinitiator which may be combined with another photoinitiator or photoinitiators.

The term "photoinitiators," as used herein, refers to compounds that absorb ultra-violet light and use the energy of that light to promote the formation of a dry layer of coating.

The term "oligomers," as used herein, refers to molecules containing several repeats of a single molecule.

The term "monomers," as used herein, refers to substances containing single molecules that can link to oligomers and to each other.

The term "polymerizable pigment dispersions," as used herein, refers to pigments attached to polymerizable resins which are dispersed in a coating composition.

The term "polymerizable resin" or "activated resin," as used herein, refers to resins which possess reactive functional groups.

The term "pigment," as used herein, refers to compounds which are insoluble or partially soluble, and are used to impart color.

The compositions of the invention are essentially solvent free, and is therefore referred to as a solids composition In accordance with a preferred embodiment of the invention, there is disclosed a composition of matter comprising UV-curable materials, photoinitiators, solid pigment dispersions and filler mixture for the coating of propane tanks, electric motors, appliances and similar articles consisting of, based on total composition weight; 25–45% epoxy acrylate, 45–60% acrylate monomer or mixture of monomers, 2–10% methacrylate ester derivative, 2–8% liquid photoinitiator or mixture of liquid photoinitiators, to which is added 8–12% solid pigment or mixture of solid pigment dispersions, 0.1%–3% mixture of organically treated amorphous silicon dioxides, and 0–3% solid photoinitiator wherein the composition is sprayable by HVLP or electrostatic bell without the addition of heat, and curable by ultraviolet radiation.

The epoxy acrylate oligomer may be selected from the group consisting of monoacrylates, diacrylates, triacrylates, polyacrylates, including mixtures thereof. Suitable compounds which may be used in the practice of the present invention include, but are not limited to, epoxy diacrylate/monomer blends, bisphenol epoxy acrylates blended with trimethylolpropane triacrylate, and an acrylated epoxy polyol blended with trimethylolpropane triacrylate.

The acrylate monomer is chosen from a group consisting of trimethylolpropane triacrylate, 2-phenoxyethyl acrylate esters, and mixtures thereof. In addition, other monomers may be selected from a group consisting of isobornyl acrylate, acrylate ester derivatives, and methacrylate ester derivatives; and cross-linking agents, such as, but not limited to, propoxylated glyceryl triacrylate, and mixture thereof.

The rapid polymerization reaction is initiated by a photoinitiator component of the composition when exposed to ultraviolet light. The photoinitiators used in the composition of the present invention are categorized as free radicals; however, other photoinitiator types can be used. Furthermore, combinations of photoinitiators may be used which encompass different spectral properties of the UV sources used to initiate polymerization. In one embodiment, the photoinitiators are matched to the spectral properties of the UV sources. It is to be appreciated that the present invention may be cured by medium pressure mercury arc lights which produce intense UV-C (200–280 nm) radiation, or by doped mercury discharge lamps which produce UV-A (315–400 nm) radiation, or UV-B (280–315 nm) radiation depending on the dopant, or by combination of lamp types depending on the photoinitiator combinations used. In addition, the presence of pigments can absorb radiation both in the UV and visible light regions, thereby reducing the effectiveness of some types of photoinitator. However, phosphine oxide type photoinitiators, for example but not limited to bis acylphosphine oxide, are effective in pigmented, including, by way of example only, black, UV-curable coating materials. Phosphine oxides also find use as photoinitiators for white coatings.

Other photoinitiators which are suitable for use in the practice of the present invention include, but are not limited to, 1-phenyl-2-hydroxy-2-methyl-1-propanone, oligo{2-hydroxy-2methyl-1-4-(methylvinyl)phenylpropanone)}, 2-hydroxy 2-methyl-1-phenyl propan-1 one, bis(2,6-dimethoxybenzoyl)-2,4,4-trimethylpentyl phosphine oxide, 1-hydroxycyclohexyl phenyl ketone and benzophenone as well as mixtures thereof. Still other useful photoiniators include, for example, bis(n,5,2,4-cyclopentadien-1-yl)-bis 2,6-difluoro-3-(1H-pyrol-1-yl)phenyl titanium and 2-benzyl-2-N,N-dimethyl amino-1-(4-morpholinophenyl)-1-butanone. These compounds are IRGACURE® 784 and IRGACURE® 369, respectively (both from Ciba Specialty Chemicals 540 White Plains Road, Tarrytown, N.Y., U.S.A.) While, still other useful photoiniators include, for example, 2-methyl-1-4(methylthio)-2-morpholinopropan-1-one, 4-(2-hydroxy)phenyl-2-hydroxy-2-(methylpropyl)ketone, 1-hydroxy cyclohexyl phenyl ketone benzophenone, (cyclopentadienyl)(1-methylethyl)benzene-iron hexafluorophosphate, 2,2-dimethoxy-2-phenyl-1-acetophen-one 2,4,6-trimethyl benzoyl-diphenyl phosphine oxide, benzoic acid, 4-(dimethyl amino)-ethyl ether, as well as mixtures thereof.

Preferably, the photoinitiators and co-photoinitiators are selected from a group consisting of phosphine oxide type photoinitiators, diphenyl(2,4,6-trimethylbenzoyl)phosphine oxide, benzophenone, 1-hydroxycyclohexyl phenyl ketone, 2-hydroxy-2-methyl-1-phenyl-propan-1-one (DAROCUR® 1173 from Ciba Specialty Chemicals 540 White Plains Road, Tarrytown, N.Y., U.S.A.)), 2,4,6-trimethylbenzophenone, 4-methylbenzophenone, oligo(2-hydroxy-2-methyl-1-(4-(1-methylvinyl)phenyl)propanone), amine acrylates, thioxanthones, benzyl methyl ketal, and mixtures thereof. More preferably, the photoinitiators and co-photoinitiators are 2-hydroxy-2-methyl-1-phenyl-propan-1-one (DAROCUR® 1173 from Ciba Specialty Chemicals 540 White Plains Road, Tarrytown, N.Y., U.S.A.), phosphine oxide type photoinitiators, IRGACURE® 500 (Ciba Specialty Chemicals 540 White Plains Road, Tarrytown, N.Y., U.S.A.), amine acrylates, thioxanthones, benzyl methyl ketal, and mixtures thereof. In addition, thioxanthone is used as a curing booster. The liquid photoinitiator is chosen from a group consisting of benzonephenones, 1-hydroxycyclohexyl phenyl ketone, phosphine oxides, and mixtures thereof. The solid photoinitiator is a phosphine oxide.

Pigments, are insoluble white, black, or colored material, typically suspended in a vehicle for use in a paint or ink, and may also include effect pigments such as micas, metallic pigments such as aluminum, and opalescent pigments.

Pigments are used in coatings to provide decorative and/or protective functions however, due to their insolubility, pigments may be a possible contributing factor to a variety of problems in liquid coatings and/or dry paint films. Examples of some film defects thought to be attributable to pigments include: undesirable gloss due to aggregates, blooming, pigment fading, pigment flocculation and/or settlement, separation of pigment mixtures, brittleness, moisture susceptibility, fungal growth susceptibility, and/or thermal instability.

An "ideal" dispersion consists of a homogeneous suspension of primary particles. However, inorganic pigments are often incompatible with the resin in which they are incorporated, and this generally results in the failure of the pigment to uniformly disperse. Furthermore, a milling step may be required as dry pigments comprise a mixture of primary particles, aggregates, and agglomerates which must be wetted and de-aggregated before the production of a stable, pigment dispersion is obtained.

The level of dispersion in a particular pigment-containing coating composition affects the application properties of the composition as well as the optical properties of the cured film. Improvements in dispersion have been shown to result in improvements in gloss, color strength, brightness, and gloss retention.

Treatment of the pigment surface to incorporate reactive functionality has improved pigment dispersion. Examples of surface modifiers include polymers such as polystyrene, polypropylene, polyesters, styrene-methacrylic acid type copolymers, styrene-acrylic acid type copolymers, polytetrafluoroethylene, polychlorotrifluoroethylene, polyethylene-tetrafluoroethylene type copolymers, polyaspartic acid, polyglutamic acid, and polyglutamic acid-γ-methyl esters, and modifiers such as silane coupling agents and alcohols.

These surface-modified pigments have improved the pigment dispersion in a variety of resins, for example, olefins such as polyethylene, polypropylene, polybutadiene, and the like; vinyls such as polyvinylchloride, polyvinylesters, polystyrene; acrylic homopolymers and copolymers; phenolics; amino resins; alkyds, epoxys, siloxanes, nylons, polyurethanes, phenoxys, polycarbonates, polysulfones, polyesters (optionally chlorinated), polyethers, acetals, polyimides, and polyoxyethylenes.

Various organic pigments can be used in the present invention including, for example, carbon black, azo-pigment, phthalocyanine pigment, thioindigo pigment, anthraquinone pigment, flavanthrone pigment, indanthrene pigment, anthrapyridine pigment, pyranthrone pigment, perylene pigment, perynone pigment and quinacridone pigment.

In addition, various inorganic pigments can be used, for example, but not limited to, titanium dioxide, aluminum oxide, zinc oxide, zirconium oxide, iron oxides: red oxide, yellow oxide and black oxide, Ultramarine blue, Prussian blue, chromium oxide and chromium hydroxide, barium sulfate, tin oxide, calcium sulfate, talc, mica, silicas, dolomite, zinc sulfide, antimony oxide, zirconium dioxide, silicon dioxide, cadmium sulfide, cadmium selenide, lead chromate, zinc chromate, nickel titanate, clays such as kaolin clay, muscovite and sericite.

Inorganic pigments, as used herein, refers to ingredients which are particulate and substantially nonvolatile in use, and includes those ingredients typically labeled as inerts, extenders, fillers or the like in the paint and plastic trade.

Inorganic pigments for the present invention advantageously are opacifying inorganic pigments, such as pigmentary titanium dioxide. Titanium dioxide pigments include rutile and anatase titanium. Treated inorganic pigments, and especially pigmentary titanium dioxide, find uses in powder paints and similar systems.

The solid pigment dispersions used in the composition of the invention may also be selected from a group consisting of the following pigments bonded with modified acrylic resins: carbon black, rutile titanium dioxide, organic red pigment, phthalo blue pigment, red oxide pigment, isoindoline yellow pigment, phthalo green pigment, quinacridone violet, carbazole violet, masstone black, light lemon yellow oxide, light organic yellow, transparent yellow oxide, diarylide orange, quinacridone red, organic scarlet, light organic red, and deep organic red. These polymerizable pigment dispersions are distinguishable from other pigment dispersions which disperse insoluble pigment particles in some type of resin and entrap the pigment particles within a polymerized matrix. The pigment dispersions used in the compositions and methods described herein have pigments treated such that they are attached to acrylic resins; consequently the pigment dispersion is polymerizable upon exposure to UV irradiation and becomes intricately involved in the overall coating properties.

The particle size of fillers can vary from micron-sized particles to nanometer-sized particles. Polymer nanocomposites are the blend of nanometer-sized fillers with either a thermoset or UV-curable polymers. Polymer nanocomposites have improved properties compared to conventional filler materials. These improved properties range include improved tensile strength, modulus, heat distortion temperature, barrier properties, UV resistance, and conductivity.

The fillers used in the composition of the invention are selected from a group consisting of amorphous silicon dioxide prepared with polyethylene wax, synthetic amorphous silca with organic surface treatment, untreated amorphous silicon dioxide, alkyl quaternary bentonite, colloidal silica, acrylated colloidal silica, alumina, zirconia, zinc oxide, niobia, titania aluminum nitride, silver oxide, cerium oxides, and combinations thereof. The silicon dioxides are chosen from a group consisting of both synthetic and natural silicon dioxides with surface treatments including polyethylene wax or waxes and IRGANOX® from Ciba Specialty Chemicals 540 White Plains Road, Tarrytown, N.Y., U.S.A.

Possible methods of applying the composition of the invention include spraying, brushing, curtain coating, dipping, and rolling. To enable spraying onto a desired surface the pre-polymerization viscosity must be controlled. This is achieved by the use of low molecular weight monomers which take the place of organic solvents. However, these monomers also participate and contribute to final coating properties and do not evaporate. The lack of solvent use with these coating compositions makes them environmentally friendly. Furthermore, without the need to thermally cure, or to incorporate drying stages with these coatings, there is no longer a need for large ovens, which decreases the space and energy commitment of the coating end-user.

The viscosity of the composition of the invention is from about 2 centipoise to about 1500 centipoise. Preferably, the composition of the invention herein has a viscosity of approximately 500 centipoise or less at room temperature, allowing coverage in one coat with application by HVLP, air-assisted/airless, or electrostatic bell without the addition of heat.

6. 100% Solids, UV-curable Coating Composition Use

The compositions of the present invention are a significant improvement as they do not contain any water or organic solvent which must be removed before complete curing is achieved. Therefore, the compositions of the present invention are much less hazardous to the environment, and are economical because they requires less space, less energy and less time. In addition, the compositions of the invention can be applied in as a single coat, and give a corrosion resistant coating. Therefore, use of the compositions and methods described herein to coat various products, such as thermally sensitive objects, decreases coating time and therefore increases production.

FIG. 1 is a flowchart of the process used to recoat and refurbish used objects such as, but not limited to used articles of manufacture. Initially the used object to be refurbished is obtained and either optionally cleaned prior to recoating, or is directly recoated with the coating compositions described herein. The recoated and refurbished object is then recycled for continued use. The term "recoat," as used herein, refers to coating of a used object which was previously coated or uncoated. The term "refurbish," as used herein, refers to restoration of a used object to a state where the object may be recycled and reused. Refurbishing may include, but is not limited to recoating, and replacement of worn seals and components.

Figure 2:
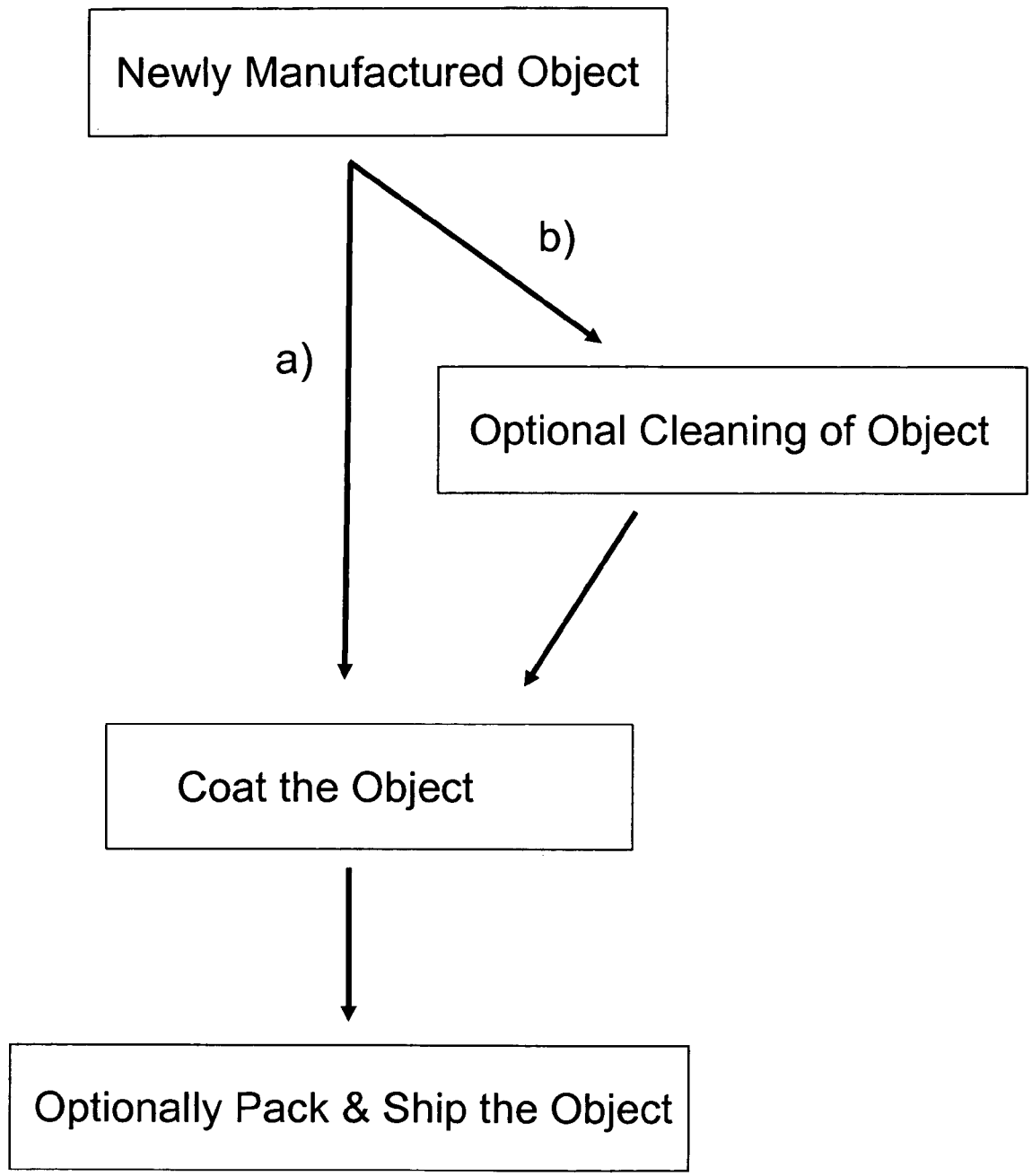
FIG. 2 is a flowchart of one possible process for coating a newly manufactured object with the coating compositions described herein.

FIG. 2 is a flowchart of the process used to coat objects such as, but not limited to newly manufactured articles. Initially the object to be coated is obtained and either optionally cleaned prior to coating, or is directly coated with the coating compositions described herein. The coated object is then optionally packed and shipped for consumer use, industrial use, scientific use, or any other use contemplated by the end user.

Figure 3:
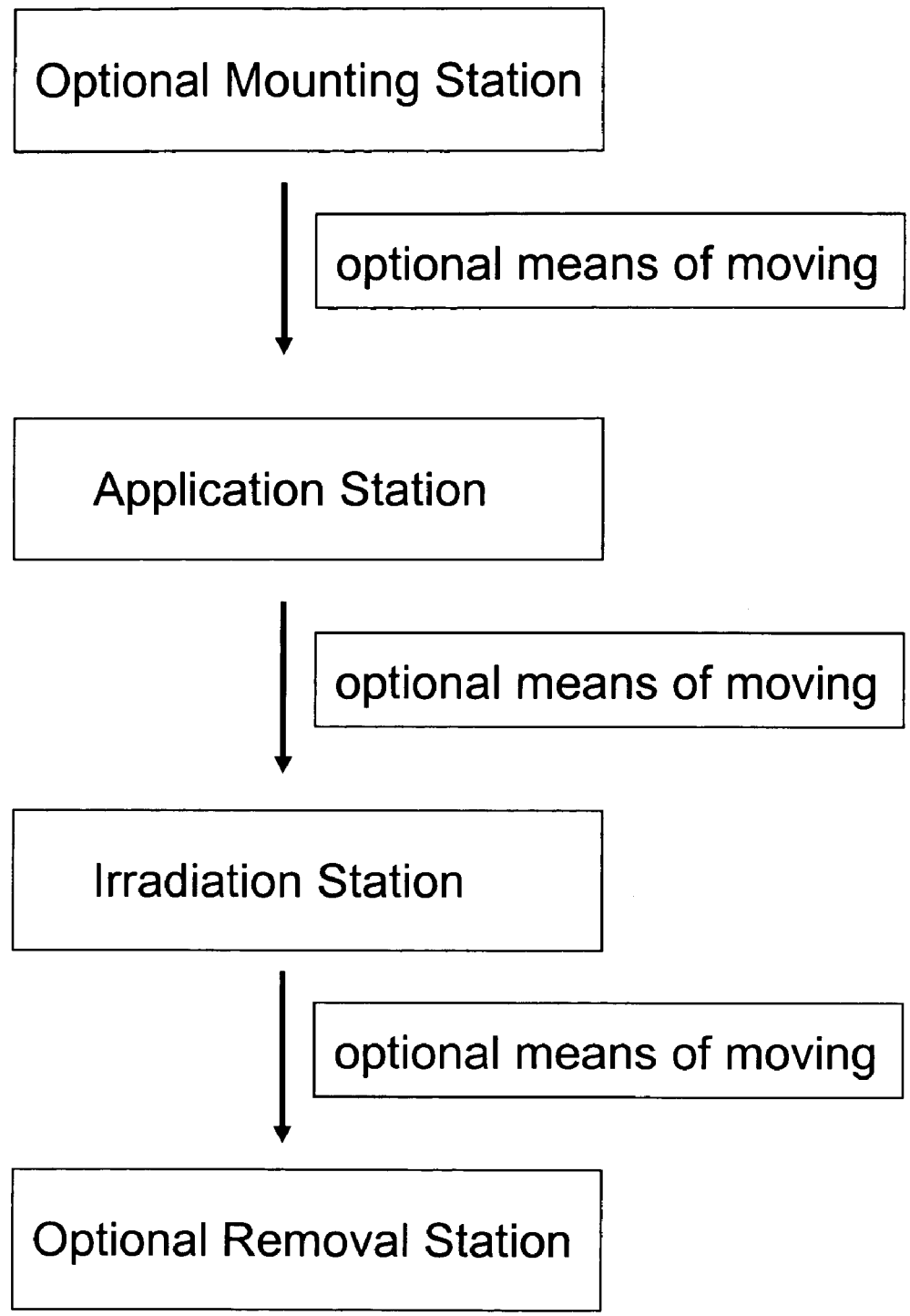
FIG. 3 is flowchart of one possible process for coating new objects or recoating used objects with the coating compositions described herein.

FIG. 3 is a schematic of the assemblage of processes used for coating or recoating objects with the UV-curable coating compositions described herein. The first stage of the assemblage is an optional mounting station, in which the object to be coated is attached to a movable unit, by way of example only, a spindle, a hook, or a baseplate. The object can be attached using, by way of example only, nails, screws, bolts and nuts, tape, glue, or any combination thereof. In addition, human workers can perform the task of attachment, or alternatively, robots can be used to do the same function. Next, the mounted object is translated by an optional means for moving to an Application Station. The optional means for moving can be achieved, by way of example only, conveyer belts, rails, tracks, chains, containers, bins, carts, and combinations thereof. In addition, the means for moving can be mounted on a wall, or a floor, or a ceiling, or any combination thereof. The Application Station is the location at which the desired object is coated with the necessary coating composition. The means for applying the coating composition is located at the Application Station. The means for applying the coating composition includes, by way of example only, high pressure low volume spraying (HVLP) equipment, electrostatic spraying equipment, air-assisted/ airless spraying equipment, brushing, rolling, dipping, blade coating, curtain coating or a combination thereof. The multiple means for applying the coating composition can be incorporated and arranged at the Application Station whereby it is ensured that top, bottom and side coverage of the object occurs. In addition, the mounted object is optionally rotated, on at least one axis, prior to and during the application of the coating composition to ensure uniform coverage. In addition, if desired masks or templates may be included in order to incorporate a design, logo, or the like onto the object. The Application Station may include multiple types of coatings, including different coating colors, as may be desired. When application of the coating composition is complete, the mounted coated object may continue to rotate, or may cease rotating. The Application Station may also include an optional reclamation system to reclaim any oversprayed coating composition, and whereby reclaim at least 98% of oversprayed coating composition. This composition recycling system allows for significant savings in the use and production of coating compositions, as the reclaimed composition can be applied to different objects in the process line.

The mounted coated object may now be translated from the Application Station, by the optional means for moving, to the Irradiation Station (also referred to herein as a curing chamber), wherein curing of the coated object occurs. The Irradiation Station is located further along the production line at a separate location from the Application Station. In one embodiment the Irradiation Station has a means for limiting exposure of actinic radiation to other portions of the assemblage. Multiple means are envisioned, including, but not limited to, doors, curtains, shields, and tunnels which incorporate angular or curved paths along the production line. The means for limiting exposure of actinic radiation of the Irradiation Station are used, such as, by way of example only, either closing doors, placement of shields, or closing curtains, to protect operators from exposure to UV radiation, and to shield the Application Station to ensure that no curing occurs there. Inside the Irradiation Station there are three sets of UV lamps arranged to ensure top, bottom and side exposure to the UV radiation. In addition each UV lamp set contains two separate lamp types; by way of example only, one mercury arc lamp and one mercury arc lamp doped with iron, to ensure proper three dimensional curing. Thus, there are actually six lamps within the Irradiation Station. Alternatively, this three dimensional curing can be achieved by using only two lamps, by way of example only, one mercury arc lamp and one mercury arc lamp doped with iron, with a mirror assembly arranged to ensure exposure to the UV radiation and curing of the top, bottom and sides of the coated object. Regardless of the specific approach used, location of the two lamp types within the Irradiation Station is adventitious as it does not require transport of the coated object to separate locations for partial curing and then complete curing.

In one embodiment, after translation of the mounted coated object inside the Irradiation Station, the doors close and the mounted coated object is again optionally rotated. The longer wavelength lamps, by way of example only, mercury arc lamp doped with iron, are activated for the partial curing stage, and then the shorter wavelength lamps, by way of example only, mercury arc lamp, are activated for the full cure stage. The longer wavelength lamps do not need to be completely off before the shorter wavelength lamps are turned on. Following the two curing stages, all lamps are turned off, the doors on the other side of the Irradiation Station are opened (if doors are installed on the Irradiation Station, otherwise object is otherwise provided an exit from the Irradiation Station) and the fully cured mounted object is translated, using the optional means for moving, to an optional Removal Station. At the optional Removal Station coated, fully cured object may be removed from the mounting and, either moved to a storage facility, using the optional means for moving, or immediately packed and shipped. In addition, human workers can perform the task of removal, or alternatively, robots can be used to do the same function. No cooling is required prior to removal, as no heat is required for the application or curing steps, with all steps occurring at ambient temperature.

Figure 4:
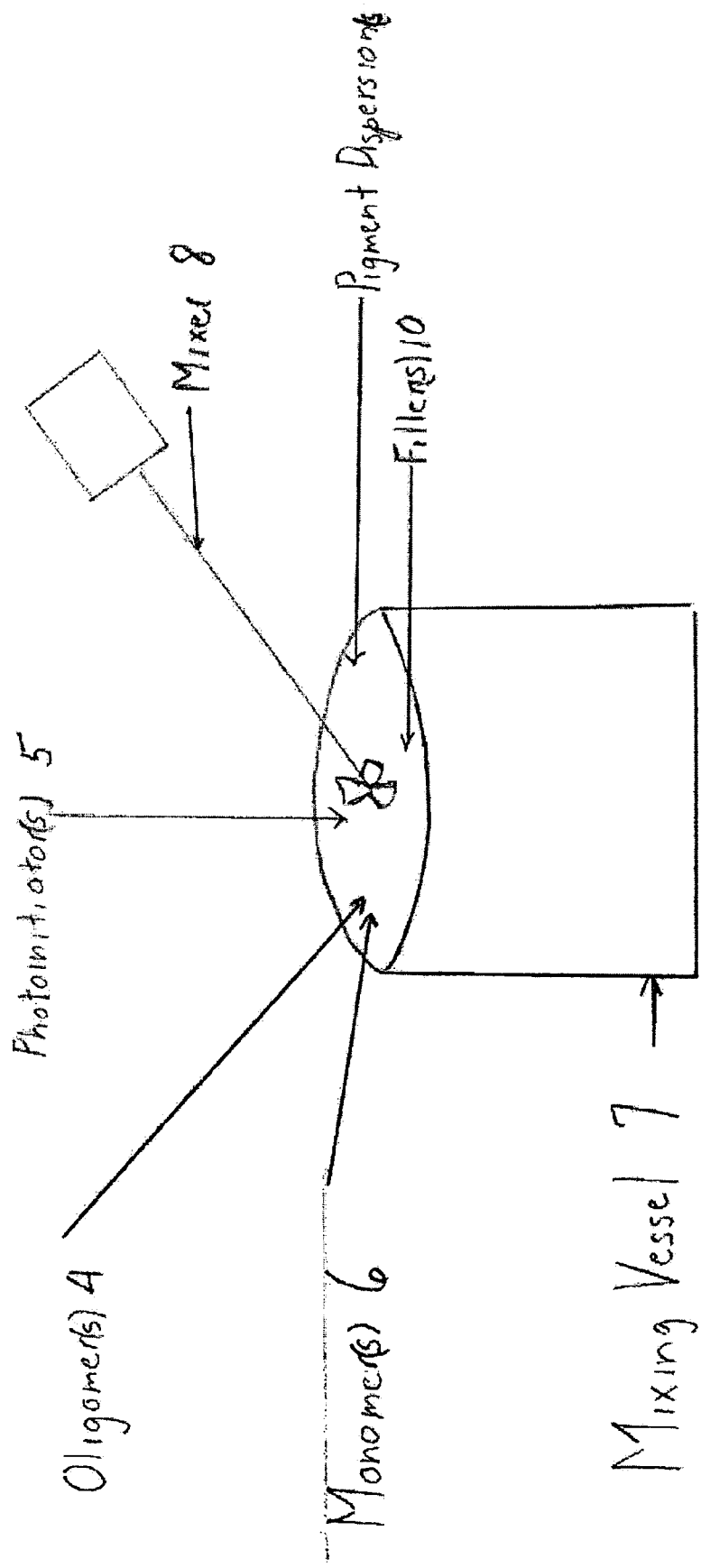
FIG. 4 is an illustration of possible processes used, and possible components required to obtain the opaque, corrosion resistant, UV-curable coating compositions described herein.

FIG. 4 depicts is an illustration of the processes used, and exemplary components of the opaque, corrosion resistant, UV-curable coating compositions described herein. Generally the components are mixed together in a mixing vessel using, by way of example only, a sawtooth blade or a helical mixer. The components of the composition are mixed at sufficient shear until a smooth, homogeneous coating mixture is obtained. In addition, mixing can be achieved by shaking, stirring, rocking, or agitating. The desired compositions are prepared to specification, such as, but not limited to, opacity, color, corrosion resistance, abrasion resistance and gloss. In addition, the coating contains a combination of oligomer and monomers such that necessary specifications are obtained. Proper choice of monomer also promotes adhesion to a surface.

Next, as shown in FIG. 5, the compositions are applied to the desired surface, such as, but not limited to a barbeque gas tank, electric motors, appliances, or propane tanks, by an application means, including, but not limited to HVLP, air-assisted/airless, or electrostatic bell. FIG. 5 shows the arrangement of spray heads used for coating or recoating, although other techniques can be used such as dipping, flow, or curtain coating. As shown in FIG. 5, the barbeque gas tank is affixed to a rotating fixture, and this combination is attached to a conveyer system for transport from the coating application area to the curing area. The resulting coating film is then cured, as shown FIG. 6, by using either a single UV light source, or a combination of light sources which emit spectral frequencies that overlap the required wavelengths needed to excite the specific photoinitiators used in the compositions. FIG. 6 indicates the one exemplary UV lamp arrangement for complete three dimensional curing. Finally, after curing is complete, the coated surface is ready for immediate handling and shipping, without the need to wait for parts to cool or for solvent emissions to dissipate.

Previous technology involves the application of conventional solvent-based compositions to obtain opaque, corrosion resistant coatings on barbeque gas tanks, or other thermally sensitive objects. Generally, thermal curing process are used which have long curing times, ranging from minutes to hours. In addition, larger space and large amounts of energy, along with a system for destruction of volatile solvents added to the compositions, are required. Furthermore, when using powder based compositions, a system for collection of particulates may be required. The 100% solids UV-curable coating compositions described herein contains no added solvents and as a result, there are no solvent emissions. No space is required for large ovens, and because heating is unnecessary the energy use may be up to 80% lower. Furthermore, the processes used to apply the compositions described herein have the ability to reclaim up to 98% of any oversprayed, uncured solids.

It has been assumed that UV radiation could not fully penetrate opaque coatings and reach the base substrate, thereby fully curing the coating. By combination of a properly formulated 100% solids UV-curable coating, and appropriate frequencies of light, these results may be obtained. Such a coating is cured by exposure to ultra-violet light, instead of heat or exposure to air. Since this curing process is almost instantaneous, requiring (for example) an average of 1.5 seconds per light (FIG. 6), both time and energy are conserved. Curing lights used may be high pressure mercury lamps, mercury lamps doped with gallium or iron, or in combination as required. Lamps may be powered by direct application of voltage, by microwaves, or by radio-waves.

A coating composition is prepared using a mixture of photoinitiators sufficient to encompass all necessary frequencies of light. These are used to work with the lights or light pairs, arranged to ensure complete cure of an object. Polymerization, in particular acrylate double bond conversion and induction period, can be affected by the choice of oligomers, photoinitiators, inhibitors, and pigments, as well as UV lamp irradiance and spectral output. In comparison to clear coat formulations, the presence of pigments may make curing much more complex due to the absorption of the UV radiation by the pigment. Thus, the use of variable wavelength UV sources, along with matching of absorption characteristics of photoinitiators with UV source spectral output, allows for curing of pigmented formulations.

Light sources used for UV curing include arc lamps, such as carbon arc lamps, xenon arc lamps, mercury vapor lamps, tungsten halide lamps, lasers, the sun, sunlamps, and fluorescent lamps with ultra-violet light emitting phosphors. Medium pressure mercury and high pressure xenon lamps have various emission lines at wavelengths which are absorbed by most commercially available photoinitiators. In addition, mercury arc lamps can be doped with iron or gallium. Alternatively, lasers are monochromatic (single wavelength) and can be used to excite photoinitiators which absorb at wavelengths that are too weak or not available when using arc lamps. For instance, medium pressure mercury arc lamps have intense emission lines at 254 nm, 265 nm, 295 nm, 301 nm, 313 nm, 366 nm, 405/408 nm, 436 nm, 546 nm, and 577/579 mm. Therefore, a photoinitiator with an absorbance maximum at 350 nm may not be a efficiently excited using a medium pressure mercury arc lamp, but could be efficiently initiated using a 355 nm Nd:YVO4 (Vanadate) solid-state lasers. Commercial UV/Visible light sources with varied spectral output in the range of 250–450 nm may be used directly for curing purposes; however wavelength selection can be achieved with the use of optical bandpass or longpass filters. Therefore, as described herein, the user can take advantage of the optimal photoinitiator absorbance characteristics.

Regardless of the light source, the emission spectra of the lamp must overlap the absorbance spectrum of the photoinitiator. Two aspects of the photoinitator absorbance spectrum need to be considered. The wavelength absorbed and the strength of absorption (molar extinction coefficient). For example, the photoinitiators HMPP (2-hydroxy-2-methyl-1-phenyl-propan-1-one) and TPO (diphenyl(2,4,6-trimethyl-benzoyl)phosphine oxide) in DAROCUR® 4265 (from Ciba Specialty Chemicals 540 White Plains Road, Tarrytown, N.Y., U.S.A.) have absorbance peaks at 270–290 nm and 360–380 nm, while MMMP in IRGACURE® 907 (from Ciba Specialty Chemicals 540 White Plains Road, Tarrytown, N.Y., U.S.A.) absorbs at 350 nm and IRGACURE® 500 (which is a blend of IRGACURE® 184 (from Ciba Specialty Chemicals 540 White Plains Road, Tarrytown, N.Y., U.S.A.) and benzophenone) absorbs between 300 nm and 450 nm.

The addition of pigment to a formulation increases the opacity of the resulting coating and can affect any through curing abilities. Furthermore, the added pigment can absorb the incident curing radiation and thereby affect the performance of the photoinitiator. Thus, the curing properties of opaque pigmented coatings can depend on the pigment present, individual formulation, irradiation conditions, and substrate reflection. Therefore consideration of the respective UV/V is absorbance characteristics of the pigment and the photoinitiator can be used to optimize UV curing of pigmented coatings. Generally, photoinitiators used for curing pigmented formulations have a higher molar extinction coefficient between the longer wavelengths (300 nm–450 nm) than those used for curing clear formulations. Although, the presence of pigments can absorb radiation both in the UV and visible light regions, thereby reducing absorption suitable for radiation curing, phosphine oxide type photoinitiators, for example but not limited to bis acylphosphine oxide, are effective in pigmented, including, by way of example only, black, UV-curable coating materials. Phosphine oxides also find use as photoinitiators for white coatings, and enable an effective through cure for the highly pigmented compositions described herein.

The mercury gas discharge lamp is the UV source most widely used for curing, as it is a very efficient lamp with intense lines UV-C (200–280 nm) radiation, however it has spectral emission lines in the UV-A (315–400 nm) and in the UV-B (280–513 nm) regions. The mercury pressure strongly affects the spectral efficiency of this lamp in the UV-A, UV-B and UV-C regions. Furthermore, by adding small amounts (doping) of silver, gallium, indium, lead, antimony, bismuth, manganese, iron, cobalt and/or nickel to the mercury as metal iodides or bromides, the mercury spectrum can be strongly changed mainly in the UV-A, but also in the UV-B and UV-C regions. Doped gallium gives intensive lines at 403 and 417 nm; whereas doping with iron raises the spectral radiant power in the UV-A region of 358–388 nm by a factor of 2, while because of the presence of iodides UV-B and UV-C radiation are decreased by a factor of 3 to 7. As discussed above, the presence of pigments in a coating formulation can absorb incident radiation and thereby affect the excitation of the photoinitiator. Thus, it is desirable to tailor the UV source used with the pigment dispersions and the photoinitiator, photoinitiator mixture or photoinitiator/co-initiator mixture used. For instance, by way of example only, an iron doped mercury arc lamp (emission 358–388 nm) is ideal for use with photoinitiator IRGACURE® 500 (absorbance between 300 and 450 nm).

Multiple lamps with a different spectral characteristics, or sufficiently different in that there is some spectral overlap, can be used to excite mixtures of photoinitiator or mixtures of photoinitatiors and co-initiators. For instance, by way of example only, the use of a iron doped mercury arc lamp (emission 358–388 nm) in combination with a pure mercury arc lamp (emission 200–280 nm). The order in which the excitation sources are applied can be adventitiously used to obtain enhanced coating characteristic, such as, by way of example only, smoothness, shine, adhesion, abrasion resistance and corrosion resistance. Initial exposure of the coated surface with the longer wavelength source is beneficial, as it traps the filler particle in place and initiates polymerization near the surface, thereby imparting a smooth and adherent coating. Following this with exposure to the higher energy, shorter wavelength radiation enables for a fast cure of the remaining film that has been set in place by the initial polymerization stage.

The time of exposure to each lamp type can be manipulated to enhance the curing of the compositions described herein. One approach used for curing of the composition used to coat barbeque gas tanks and other thermally sensitive objects, as well as objects with surface rust, is the objects are exposed to the longer wavelength doped mercury arc lamps for a shorter time than exposure to the shorter wavelength mercury arc lamp. However, this exposure scheme may cause the cured coatings to wrinkle/crinkle. Therefore, other exposure schemes involve identical exposure time for both the short wavelength mercury arc lamp, and the longer wavelength doped mercury arc lamps, or alternatively the exposure time to the longer wavelength doped mercury arc lamp can be longer than the time of exposure for the short wavelength mercury arc lamps.

EXAMPLES

Example 1

In a preferred embodiment of this composition a clear coating is prepared that is 37.5% of a blend bisphenol epoxy acrylate with 25% trimethylolpropane triacrylate (EBECRYL® 3720-TP25, from UCB Surface Specialties, Brussels, Belgium), 34.1% 2-phenoxyethyl acrylate, 15.8% trimethylolpropane triacrylate, 7.3% methacrylate ester derivative (EBECRYL® 168, from UCB Surface Specialties, Brussels, Belgium), and 5.3% of IRGACURE® 500 (from Ciba Specialty Chemicals 540 White Plains Road, Tarrytown, N.Y., U.S.A.). A mixture of solid pigment dispersions is prepared using rutile titanium dioxide bonded to a modified acrylic (PC 9003 from Elementis, Staines, UK) to which 1.2% of a similarly bonded carbon black (PC 9317 from Elementis, Staines, UK) is added. To the clear coating is added 10.1% of the pigment dispersion mixture, 1% amorphous silicon dioxide prepared with polyethylene wax (SYLOID® RAD 2005, from the Grace Davison division of WR Grace & Co., Columbia, Md., U.S.A.), 0.2% synthetic amorphous silica with organic surface treatment (SYLOID® RAD 2105, from the Grace Davison division of WR Grace & Co., Columbia, Md., U.S.A.), and 2.1% diphenyl(2,4,6-trimethylbenzoyl)phosphine oxide (Lucirin®TPO is available from BASF Corporation, 100 Campus Drive, Florham Park, N.J., USA). These additions are dispersed throughout the clear coating by a helical mixer until a smooth coating is produced. This coating may be applied by HVLP and cured by UV light.

Example 2

A further embodiment is the procedure used for making a clear coat. The components of the coatings composition are mixed under air, as the presence of oxygen prevents premature polymerization. It is desired that exposure light be kept to a minimum, in particularly the use of sodium vapor lights should be avoided. However, the use of darkroom lighting may be an option. The components used in the manufacture of the coating composition which come in contact with monomers and coating mixture, such as mixing vessels and mixing blades, should be made of stainless steel or plastic, preferably polyethylene or polypropylene. Polystyrene and PVC should be avoided, as the monomers and coating mixture will dissolve them. In addition, contact of the monomers and coating mixture with mild steel, alloys of copper, acids, bases, and oxidizers should be avoided. Furthermore, brass fittings must be avoided, as they will cause premature polymerization or gelling. For the manufacture of clear coatings it is only essential to obtain thorough mixing, and consequently the control of shear is not necessary. Adequate mixing of the clear coating composition can be obtained after 1–3 hours using a ⅓ horse power (hp) mixer and a 50 gallon cylindrical tank. Smaller quantities, up to 5 gallons, can be adequately mixed after 3 hours using a laboratory mixer (1/15–1/10 hp). Round walled vessels are desired as this avoids accumulation of solid oligomer in corners and any subsequent problems associated with incomplete mixing. Another, parameter is that the mixers blades should be placed off of the bottom of the mixing vessel, at a distance of one half of the diameter of the mixer. The oligomers are added to the mixing vessel first, and if necessary the oligomers are gently warmed to aid in handling. Oligomers should not be heated over 120° F., therefore if warming is needed the use of a temperature controlled heating oven or heating mantle is recommended. Band heaters should be avoided. Monomers and colloidal suspensions are added next, in any order, followed by the ester/monomer adhesion promoters. Photoinitiators are added last to ensure that the time the complete composition is exposed to light is minimized. With the mixing vessel shielded from light exposure the mixing is then carried out after all the components are added. After mixing, there are air bubbles present and the coating may appear cloudy. These bubbles rapidly dissipate, leaving a clear coating composition. As a final step, prior to removing the coating composition from the mixing vessel, the bottom of the mixing vessel is scraped to see if any un-dissolved oligomer is present. This is done as a precaution to ensure thorough mixing has taken place. If the composition is thoroughly mixed then the coating composition is filtered through a 1 micron filter using a bag filter. The composition is then ready for use.

Example 3

A further embodiment is the manufacture procedure for pigmented coatings. Here a mixer of sufficient power and configuration is used to create laminar flow and efficiently bring the pigment dispersions against the blades of the mixer. For small laboratory quantities below 400 mLs, a laboratory mixer or blender is sufficient, however for quantities of up to half of a gallon a 1/15–1/10 hp laboratory mixer can be used, but mixing will take several days. For commercial quantities, a helical or saw-tooth mixer of at least 30 hp with a 250 gallon round walled, conical bottomed tank may be used. To make a pigmented composition a clear coating composition is mixed first, see Example 4. The pigment dispersion mixtures are premixed prior to addition to the clear coat composition as this ensures obtaining the correct color. The premixing of the pigments dispersions is easily achieved by shaking the pigments dispersion in a closed container, while wearing a dust mask. The fillers, the premixed pigments/pigment dispersions, and solid photoinitiator are then added to the clear coat composition and mixed for 1½ to 2 hours. Completeness of mixing is determined by performing a drawdown and checking for un-dissolved pigment. This is accomplished by drawing off a small quantity of the pigmented mixture from the bottom of the mixing tank and applying a thin coating onto a surface. This thin coating is then examined for the presence of any pigment which had not dissolved. The mixture is then run through a 100 mesh filter. A thoroughly mixed pigmented coating composition will show little or no un-dissolved pigment.

Example 4

Another embodiment is the incorporation of nano-particulates into a coating composition by mixing 37.5% of a blend bisphenol epoxy acrylate with 25% trimethylolpropane triacrylate (EBECRYL® 3720-TP25, from UCB Surface Specialties, Brussels, Belgium), 34.1% 2-phenoxyethyl acrylate, 15.8% trimethylolpropane triacrylate, 7.3% methacrylate ester derivative (EBECRYL® 168, from UCB Surface Specialties, Brussels, Belgium), and 5.3% of IRGACURE® 500 (from Ciba Specialty Chemicals 540 White Plains Road, Tarrytown, N.Y., U.S.A.). A mixture of solid pigment dispersions is prepared using rutile titanium dioxide bonded to a modified acrylic (PC 9003 from Elementis, Staines, UK) to which 1.2% of a similarly bonded carbon black (PC 9317 from Elementis, Staines, UK) is added. To the clear coating is added 10.1% of the pigment dispersion mixture, 1% nanometer sized alumina particles, 1% amorphous silicon dioxide prepared with polyethylene wax (SYLOID® RAD 2005, from the Grace Davison division of WR Grace & Co., Columbia, Md., U.S.A.), 0.2% synthetic amorphous silica with organic surface treatment (SYLOID® RAD 2105, from the Grace Davison division of WR Grace & Co., Columbia, Md., U.S.A.), and 2.1% diphenyl(2,4,6-trimethylbenzoyl)phosphine oxide (Lucirin®TPO is available from BASF Corporation, 100 Campus Drive, Florham Park, N.J., USA). These additions are dispersed throughout the clear coating by a helical mixer until a smooth coating is produced. This coating may be applied by HVLP and cured by UV light.

Example 5

Still another embodiment is the process for coating the external surface of a barbeque gas tank with an actinic radiation curable, substantially all solids composition as described in example 1, using a grey pigment dispersion. The process begins by attaching a barbeque gas tank to a rotatable spindle, and then attaching this combination to a conveyer belt system. The gas tank may be pre-cleaned using a biodegradable organic cleaner at a separate Cleaning Station or the gas tank may be pre-cleaned prior to attachment onto the rotatable spindle. It is not necessary to remove any paper labels or other markings from the tank prior to coating, nor is it necessary to remove any previous coating or rust (if any); finally, although it is preferable to remove loose dirt, food particles or grease from the tank, the coating may still be applied to even a dirty tank. Note that rotation of the rotatable spindle/tank assembly during the coating procedure ensures a complete coating of the tank surface. The rotatable spindle/tank assembly is then moved via the conveyer belt system into the coating application section, locating the rotatable spindle/tank assembly in the vicinity of electrostatic spraying system. The electrostatic spraying system has three spray heads arranged to ensure top, bottom and side coverage of the object being coated. Rotation of the spindle/tank assembly begins prior to spraying of the coating composition (described in Example 1) from the three spray heads. The coating composition is then applied simultaneously from the three electrostatic spray heads, while the spindle/tank assembly continues to rotate. The coated spindle/tank assembly is then transported by the conveyer belt into a curing chamber located further down the process line. The curing chamber has two sets of doors which are closed during curing to protect operators form exposure to UV radiation. Inside the curing chamber the three sets of UV lamps are arranged to ensure top, bottom and side exposure to the UV radiation. Furthermore each UV lamp set contains two separate lamp types; one a mercury arc lamp and the other a mercury arc lamp doped with iron, to ensure proper curing. Therefore there are actually six lamps with in the curing chamber. Note that this three dimensional curing can be achieved by using only two lamps, one a mercury arc lamp and the other a mercury arc lamp doped with iron, with a mirror assembly to ensure exposure to the top, bottom and sides. Once inside the curing chamber the doors close and the spindle/tank assembly is again rotated. The mercury arc lamp doped with iron is then activated for the partial curing stage, and then the mercury arc lamp is activated for full cure. Note that the mercury arc lamp doped with iron does not need to be completely off before the mercury arc lamp is turned on, and the time of exposure to the doped mercury arc lamp is less than the time of exposure to the pure mercury arc lamp. Both lamps are turned off and rotation of the spindle/tank assembly is stopped. The doors on the other side of the curing chamber are opened and the fully cured barbeque gas tank with a grey pigmented corrosion resistant coating is then moved via the conveyer belt to a packaging area away from the curing chamber. The tank is then removed from the rotatable spindle, packed and shipped.

Example 6

Still another embodiment is the process for coating the external surface of a rusty barbeque gas tank with an actinic radiation curable, substantially all solids composition as described in example 1, using a grey pigment dispersion. To begin the process attach a rusty barbeque gas tank to a rotatable spindle, and then attach this combination to a conveyer belt system. The rusty gas tank may be pre-cleaned using biodegradable organic cleaner at a separate Cleaning Station or the rusty gas tank may be pre-cleaned prior to attachment to the rotatable spindle. It is not necessary to remove any paper labels or other markings from the rusty tank prior to coating, nor is it necessary to remove any previous coating; finally, although it is preferable to remove loose dirt, food particles or grease from the rusty tank, the coating may still be applied to even a dirty rusty tank. Note that rotation of the rotatable spindle/rusty tank assembly during the coating procedure ensures a complete coating of the tank surface. The rotatable spindle/rusty tank assembly moves via the conveyer belt system into the coating application section, locating the rotatable spindle/rusty tank assembly in the vicinity of electrostatic spraying system. The electrostatic spraying system has three spray heads arranged to ensure top, bottom and side coverage of the object being coated. Rotation of the spindle/rusty tank assembly begins prior to spraying of the coating composition (described in Example 1) from the three spray heads. The coating composition is applied simultaneously from the three electrostatic spray heads, while the spindle/rusty tank assembly continues to rotate. The coated spindle/rusty tank assembly moves by the conveyer belt into a curing chamber located further down the process line. The curing chamber has two sets of doors which are closed during curing to protect operators form exposure to UV radiation. Inside the curing chamber the three sets of UV lamps are arranged to ensure top, bottom and side exposure to the UV radiation. Furthermore each UV lamp set contains two separate lamp types; one a mercury arc lamp and the other a mercury arc lamp doped with iron, to ensure proper curing. Therefore there are actually six lamps with in the curing chamber. Note that this three dimensional curing can be achieved by using only two lamps, one a mercury arc lamp and the other a mercury arc lamp doped with iron, with a mirror assembly to ensure exposure to the top, bottom and sides. Once inside the curing chamber the doors close and the spindle/tank assembly rotates again. Activate the mercury arc lamp doped with iron is for the partial curing stage, and then activate the mercury arc lamp for full cure. Note that the mercury arc lamp doped with iron does not need to be completely off before the mercury arc lamp is turned on, and the time of exposure to the doped mercury arc lamp is less than the time of exposure to the pure mercury arc lamp. Turn off both lamps and stop the rotation of the spindle/coated tank assembly. The doors on the other side of the curing chamber open and the fully cured barbeque gas tank with a grey pigmented corrosion resistant coating moves via the conveyer belt to a packaging area away from the curing chamber. Remove the tank from the rotatable spindle, and pack and ship.

Example 7

A further embodiment is testing the stability of the UV-curable coating described in Example 1. The adhesion stability of the cured composition coated onto a barbeque gas tank, as described in Example 5, was conducted using a cross-hatched adhesion test. The cross hatch tape test uses a cross-hatch pattern obtained from a special cross-hatch cutter with multiple preset blades to ensure the incisions are properly spaced and parallel. The cuts are made through the coating down to the underlying surface. Pressure sensitive tape is applied and removed over the cuts made in the coating, and the tape is then pulled off, the cut area and inspected for any removed coating. The coating obtained from the composition described in example 1 shows 99+% adhesion.

All percentages given are by weight. EBECRYLs® are available from UCB Surface Specialties, Brussels, Belgium. SYLOIDs® are available from the Grace Davison division of WR Grace & Co., Columbia, Md., U.S.A. Cited solid pigment dispersions are available from Elementis, Staines, UK. IRGACURE® and DAROCUR® photoinitiators are available ® from Ciba Specialty Chemicals 540 White Plains Road, Tarrytown, N.Y., U.S.A. LANCO MATTE 2000® is available from Lubrizol, Wickliffe, Ohio U.S.A. CN386 and CN990 are available from Sartomer, Exton, Pa., U.S.A. ESACURE® KTO 46 is available from Lamberti S.p.A., Gallarate (Va.), Italy. LUCIRIN®TPO is available from BASF Corporation, 100 Campus Drive, Florham Park, N.J., USA. IRGANOX® from Ciba Specialty Chemicals 540 White Plains Road, Tarrytown, N.Y., U.S.A.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An actinic radiation curable, substantially all solids coating composition consisting essentially of 25–45% percent by weight an oligomer or a multiplicity of oligomers, 45–60% by weight of a monomer or a multiplicity of monomers, 2–11% by weight of a photoinitiator or a multiplicity of photoinitiators and co-initiators, 0.1–3% by weight of a filler or a multiplicity of fillers, and 8–12% by weight of a polymerizable pigment dispersion or a multiplicity of polymerizable pigment dispersions, wherein the composition is suited for coating a thermally sensitive object and/or is suited for coating an object comprising a rusted surface portion, wherein the average size of at least one type of the filler particles is less than 500 nanometers and the polymerizable pigment dispersions are comprised of at least one pigment attached to an activated resin; and wherein the composition has a viscosity suited for application to a surface using spraying without the addition of heat.

2. The actinic radiation curable, substantially all solids coating composition of claim 1, wherein at least one oligomer is selected from a group consisting of an epoxy acrylate, an epoxy diacrylate/monomer blend, a bisphenol epoxy acrylate blended with trimethylolpropane triacrylate, and combinations thereof.

3. The actinic radiation curable, substantially all solids coating composition of claim 1, wherein at least one monomer is selected from a group consisting of trimethylolpropane triacrylate, 2-phenoxyethyl acrylate, isobornyl acrylate, propoxylated glyceryl triacrylate, a methacrylate ester derivative, and combinations thereof.

4. The actinic radiation curable, substantially all solids coating composition of claim 1, wherein at least one photoinitiator is selected from a group consisting of diphenyl (2,4,6-trimethylbenzoyl)phosphine oxide, a thioxanthone, dimethyl ketal, benzophenone, 1-hydroxycyclohexyl phenyl ketone, 2-hydroxy-2-methyl-1-phenyl-propan-1-one, 2,4,6,-trimethylbenzophenone, 4-methylbenzophenone, oligo(2-hydroxy-2-methyl-1-(4-(1-methylvinyl)phenyl)propanone), an amine acrylate, and combinations thereof.

5. The actinic radiation curable, substantially all solids coating composition of claim 1, wherein at least one photoinitiator is a phosphine oxide.

6. The actinic radiation curable, substantially all solids coating composition of claim 1, wherein at least one filler comprises particles and is selected from a group consisting of amorphous silicon dioxide prepared with polyethylene wax, synthetic amorphous silica with organic surface treatment, and combinations thereof.

7. The actinic radiation curable, substantially all solids coating composition of claim 1, wherein the activated resin is selected from a group consisting of an acrylate resin, a methacrylate resin, and a vinyl resin.

8. The actinic radiation curable, substantially all solids coating composition of claim 1, wherein the pigment is selected from a group consisting of carbon black, rutile titanium dioxide, organic red pigment, phthalo blue pigment, red oxide pigment, isoindoline yellow pigment, phthalo green pigment, quinacridone violet, carbazole violet, masstone black, light lemon yellow oxide, light organic yellow, transparent yellow oxide, diarylide orange, quinacridone red, organic scarlet, light organic red, and deep organic red.

9. The actinic radiation curable, substantially all solids coating composition of claim 1, wherein the composition is heavily pigmented.

10. The actinic radiation curable, substantially all solids coating composition of claim 1, wherein the thermally sensitive object is a used object.

11. The actinic radiation curable, substantially all solids coating composition of claim 1, wherein the composition coats at least a portion of a surface of a used object and the coating is uncured.

12. The uncured coated surface of claim 11.

13. The uncured coated surface of claim 11, wherein at least a portion of the pre-coated surface is oxidized.

14. The uncured coated surface of claim 11, wherein the pre-coated surface includes a marking that is a label adhering to the pre-coated surface.

15. The uncured coated surface of claim 11, wherein the coating has been applied to the pre-coated surface by a high-pressure low-volume spraying apparatus.

16. The uncured coated surface of claim 11, wherein the coating has been applied to the pre-coated surface by an electrostatic spraying apparatus.

17. The uncured coated surface of claim 11, wherein the coating has been applied to the pre-coated surface by an air-assisted/airless apparatus.

18. The uncured coated surface as in any of claims 15–17, wherein the coating is applied in a single application.

19. A partially cured coated surface prepared by exposing the uncured coated surface of claim 11 to actinic radiation.

20. A completely cured coated surface prepared by exposing the partially cured coated surface of claim 19 to actinic radiation.

21. The completely cured coated surface of claim 20, wherein the completely cured coating is glossy.

22. The completely cured coated surface of claim 20, wherein the completely cured coating is corrosion resistant.

23. The actinic radiation curable, substantially all solids coating composition of claim 1, wherein the composition is curable with actinic radiation selected from the group consisting of visible radiation, near visible radiation, ultra-violet (UV) radiation, and combinations thereof.

24. The actinic radiation curable, substantially all solids coating composition of claim 23, wherein the UV radiation is selected from the group consisting of UV-A radiation, UV-B radiation, UV-B radiation, UV-C radiation, UV-D radiation, or combinations thereof.

25. An article of manufacture comprising the completely cured coated surface of claim 20.

26. An article of manufacture of claim 25, wherein the article of manufacture is a used article of manufacture.

27. The article of manufacture of any of claims 25, wherein the article of manufacture is a gas tank.

28. The article of manufacture of claim 27, wherein the gas tank selected from the group consisting of a barbeque propane tank, an industrial gas tank, and a portable camp stove cylinder.

29. A method for producing the actinic radiation curable, substantially all solids coating composition of claim 1 comprising adding components to a container, wherein the components consist essentially of at least one oligomer, at least one monomer, at least one photoinitiator, at least one co-photoinitiator, at least one filler, and at least one polymerizable pigment dispersion, and using a means for mixing the components together.

30. An assemblage for coating at least a portion of a surface of an object with an actinic radiation curable, substantially all solids coating composition comprising:

(a) a means for applying to the surface of the object an actinic radiation curable, substantially all solids coating composition;

(b) a first means for irradiating the applied coating with a first actinic radiation so as to partially cure the applied coating on the surface; and (c) a second means for irradiating the object with a second actinic radiation so as to completely cure the partially cured coating on the surface;

wherein the actinic radiation curable, substantially all solids coating composition is suited for coating thermally sensitive objects and/or suited for coating an object comprising a rusted surface portion wherein the composition is the actinic radiation curable, substantially all solid coating composition of claim 1.

31. A process for coating at least a portion of a surface of an object with an actinic radiation curable, substantially all solids coating composition comprising:

(a) attaching the object onto a conveying means;

(b) applying an actinic radiation curable composition at an application station onto the surface of the object;

(c) moving the object via the conveying means to an irradiation station;

(d) irradiating and partially curing the coating at the irradiation station with a first actinic radiation; and (e) irradiating and completely curing the coating at the irradiation station with a second actinic radiation;

wherein the actinic radiation curable, substantially all solids coating composition is suited for coating thermally sensitive objects and/or suited for coating an object comprising a rusted surface portion.

32. The process for coating at least a portion of a surface of an object of claim 31, wherein the application station comprises equipment for electrostatic spraying.

33. The process for coating at least a portion of a surface of an object of claim 31, wherein the application station comprises equipment for air-assisted/airless spraying.

34. The process for coating at least a portion of a surface of an object of claim 31, wherein the application station comprises equipment suitable for high-pressure low-volume coatings application.

35. The process for coating at least a portion of a surface of an object of claims 32–34, wherein the coating is applied in a single application.

36. The process for coating at least a portion of a surface of an object of claim 31, wherein the length of time of the first actinic radiation step is longer than the length of time of the second actinic radiation step.

37. The process for coating at least a portion of a surface of an object of claim 31, wherein the length of time of the first actinic radiation step is identical to the length of time of the second actinic radiation step.

38. The process for coating at least a portion of a surface of an object of claim 31, wherein the irradiation station includes at least one light capable of providing actinic radiation selected from the group consisting of visible radiation, near visible radiation, ultra-violet (UV) radiation, and combinations thereof.

39. The process for coating at least a portion of a surface of an object of claim 31, wherein the irradiation station includes at least one light source capable of providing actinic radiation selected from the group consisting of UV-A radiation, UV-B radiation, UV-B radiation, UV-C radiation, UV-D radiation, or combinations thereof.

40. The process for coating at least a portion of a surface of an object of claim 31, wherein the irradiation station includes an arrangement of mirrors such that the coated surface can be cured in three dimensions.

41. The process for coating at least a portion of a surface of an object of claim 31, wherein the irradiation station includes an arrangement of light sources such that the coated surface can be cured in three dimensions.

42. The process for coating at least a portion of a surface of an object of claim 41, wherein each light source emits different spectral wavelength ranges.

43. The process for coating at least a portion of a surface of an object of claim 42, wherein the different light sources have partially overlapping spectral wavelength ranges.

44. A production line for coating at least a portion of a surface of an object with an actinic radiation curable, substantially all solids coating composition comprising the process of claim 31.

45. A facility for producing objects coated at least in part with an actinic radiation cured substantially all solids coating composition comprising the production line of claim 44.

46. The production line for coating at least a portion of claim 44, wherein the object is a thermally sensitive object.

47. The prodution line for coating at least a portion of claim 44, wherein the object comprises a rusted surface portion.

48. The actinic radiation curable, substantially all solids coating composition of claim 10, wherein the thermally sensitive object comprising a rusted surface portion is a refurbished object.

* * * * *